US006784634B2

(12) United States Patent
Sweo

(10) Patent No.: US 6,784,634 B2
(45) Date of Patent: Aug. 31, 2004

(54) BRUSHLESS DOUBLY-FED INDUCTION MACHINE CONTROL

(76) Inventor: Edwin A. Sweo, 9905 Lake Washington Blvd. NE., Bellevue, WA (US) 98004

(*) Notice: Subject to any disclaimer, the term of this patent is extended or adjusted under 35 U.S.C. 154(b) by 106 days.

(21) Appl. No.: 10/238,428

(22) Filed: Sep. 9, 2002

(65) Prior Publication Data

US 2003/0052643 A1 Mar. 20, 2003

Related U.S. Application Data

(60) Provisional application No. 60/322,201, filed on Sep. 14, 2001, provisional application No. 60/347,822, filed on Oct. 23, 2001, and provisional application No. 60/348,520, filed on Jan. 16, 2002.

(51) Int. Cl.[7] .............................. H02P 1/24; H02P 9/04; H02P 11/00; H02P 5/28; H02P 7/36
(52) U.S. Cl. ...................... 318/727; 318/800; 318/732; 318/767; 290/46; 322/16; 322/29
(58) Field of Search .................................. 318/254, 701, 318/798, 727, 799, 800, 732, 432, 720, 721, 722, 723, 724, 439, 138, 139, 767; 322/14, 15, 16, 17, 29, 32, 44, 91; 310/112; 290/46, 38 R

(56) References Cited

U.S. PATENT DOCUMENTS

| 3,183,431 A | | 5/1965 | Ford ........................... 322/32 |
| 3,571,693 A | | 3/1971 | Riaz ............................ 322/32 |
| 3,781,616 A | * | 12/1973 | Mokrytzki et al. ......... 318/801 |
| 4,229,689 A | | 10/1980 | Nickoladze ................... 322/32 |
| 4,246,531 A | | 1/1981 | Jordan .......................... 322/28 |
| 4,277,735 A | * | 7/1981 | Okuyama et al. ............ 318/766 |
| 4,305,001 A | | 12/1981 | Vamaraju et al. .............. 290/5 |
| 4,455,522 A | | 6/1984 | Lipo ........................... 318/809 |
| 4,472,673 A | | 9/1984 | Miller .......................... 322/32 |
| 4,701,691 A | * | 10/1987 | Nickoladze .................. 322/32 |
| 4,743,777 A | * | 5/1988 | Shilling et al. ................ 290/46 |
| 4,757,240 A | * | 7/1988 | Mizobuchi et al. ........... 318/52 |
| 4,794,316 A | * | 12/1988 | Uchino et al. ................ 322/47 |
| 4,816,696 A | * | 3/1989 | Sakayori et al. .............. 290/52 |
| 4,994,684 A | | 2/1991 | Lauw et al. ................... 290/52 |
| 5,028,804 A | | 7/1991 | Lauw .......................... 290/40 |
| 5,083,077 A | * | 1/1992 | Wallace et al. ............... 322/32 |
| 5,239,251 A | | 8/1993 | Lauw .......................... 318/767 |
| 5,359,272 A | * | 10/1994 | Liao ........................... 318/732 |
| 5,798,631 A | | 8/1998 | Spee et al. .................... 322/25 |
| 5,886,445 A | * | 3/1999 | Hsu ........................... 310/211 |
| 6,278,211 B1 | * | 8/2001 | Sweo .......................... 310/114 |

OTHER PUBLICATIONS

Hopfensperger, B. et al. 2001. "Combined magnetising flux oriented control of the cascaded doubly–fed induction machine." *IEEE Proc. Electr. Power Appl.* 148:4 (Jul.) 354–62.

(List continued on next page.)

Primary Examiner—Rina Duda
Assistant Examiner—Eduardo Colon Santana
(74) Attorney, Agent, or Firm—Ronald M. Anderson

(57) ABSTRACT

Processor-based field oriented control for brushless doubly-fed induction machine having first and second polyphase stator windings is programmed to operate the machine in various modes, as a motor or a generator, with bumpless switching between operating modes. An electronic power converter controls a current supplied to the first stator winding to control the torque of the machine, with the second stator winding selectively connected to an AC line. Stationary coordinates for in-phase and quadrature current commands are coordinate transformed using a voltage vector for voltage induced on the first polyphase stator winding to control current in the first stator winding, with or without a position sensor. The electronic power converter controls the voltage supplied to the first stator for generating, with the second stator selectively connected to a load. The machine can also be controlled to operate as a singly-fed motor at lower speeds, with the second stator winding shorted.

32 Claims, 18 Drawing Sheets

OTHER PUBLICATIONS

Lun, Xie et al. 2001. "The Research of Brushless Doubly–Fed Ac Excited Induction Machine Drive." *IECMS*: 972–95.

Shoudao, Huang et al. ND. A study of the control strategy on rotor field orientation for brushless doubly–fed machine. Paper. Dept. of Electr. Eng., Hunan University, China: 508–13.

Zhou, D. and R. Spee. 1996. "Field Oriented Control Development for Brushless Doubly–Fed Machines." *IEEE–IAS Annual Meeting*: 304–10.

Leonhard, W. 1985. "Control of Electrical Drives." *Regelung in der elektrischen Antriebstechnik*. Springer–Verlag, Berlin: pp 244–254.

\* cited by examiner

US 6,784,634 B2

BRUSHLESS DOUBLY-FED INDUCTION MACHINE CONTROL

RELATED APPLICATIONS

This application is based on prior co-pending U.S. provisional patent applications, Serial No. 60/322,201 filed Sep. 14, 2001, Serial No. 60/347,822 filed Oct. 23, 2001, and Serial No. 60/348,520 filed Jan. 16, 2002, the benefit of the filing dates of which is hereby claimed under 35 U.S.C. §119(e).

FIELD OF THE INVENTION

The present invention generally relates to controls for induction machines, and more specifically, to controls for brushless doubly-fed induction machines, including both motors and generators.

BACKGROUND OF THE INVENTION

Doubly-fed induction machines have been used as variable speed electric motors or generators. Generators of this type have been controlled with a power converter that has a lower power rating than the machine electrical power output, while motors of this type have been controlled with a power converter having a lower electrical power output than the motor mechanical power output. The prior art also teaches that wound rotor induction machines having a stator connected to an alternating current (AC) power line can be controlled with a field oriented or flux vector control that is connected to the rotor to provide accurate control of the machine currents and torque when the machine is used as either a generator or a motor. FIG. 1A is a power circuit block diagram illustrating this prior art configuration. The stator of a doubly-fed machine 10 is connected through current sensors 20 to an AC power line 14, which also supplies power to a current regulating motor control 12. Control of the current in rotor leads 22 controls the torque. The mathematical model and design basis for such a control, including the use of rotor position and stator and rotor currents to determine the position of the flux vector, are disclosed in Chapter 13.1 of the textbook "Control of Electrical Drives," by Werner Leonhard, Springer-Verlag (1985).

Flux vector control provides substantially independent control of the distribution of excitation current between the rotor and stator, and of the quadrature stator current, which determines torque. The applied AC stator voltage and machine characteristics determine the total excitation current. The control regulates the stator portion of excitation in response to a reactive current reference and commands the necessary rotor excitation current to attain the required total excitation of the machine. This type of control accurately regulates the excitation and quadrature (torque producing) stator currents within preset limits and provides accurate torque control within preset limits, even if external loads exceed the rated machine or control capability.

As taught by the above-noted Leonhard text and other references, wound rotor machines that have a stator connected to the AC power line require power to flow from the rotor connection to the control when motoring at sub-synchronous speeds, which are speeds below the synchronous speed at which the frequency of the power at the control connection to the rotor of the machine is zero Hz. When the machine is operating as a generator, power flows into the rotor at subsynchronous speeds and from the rotor to the control at super-synchronous speeds.

Flux vector control of singly-fed induction machines, i.e., of a conventional AC induction motor 30, is also taught by the Leonhard textbook and this technique is commonly used in industrial motor and generator controls. Controls 26 all rely on position feedback 32 of rotor position, or electrical measurements of the stator, to provide the information needed to estimate the flux in the rotor. FIG. 1B is a power circuit block diagram of this prior art control configuration.

Control of the rotor with an inverter 44 in a doubly-fed wound rotor generator 36 for standalone applications is shown in the power circuit block diagram of FIG. 1C. Typically a DC bus power source 42 supplies control power to inverter 44 until the power output of generator 36 to inverter inputs 34 is adequate to supply control power. Inverter 44 controls the frequency and voltage of generator 36 rotor inputs 46. Voltage taps 18 are monitored for control of output voltage. This configuration is also taught by Leonhard and by other prior art references.

The slip rings of wound rotor doubly-fed machines can be eliminated with brushless doubly-fed machines of several types. These include dual rotor-stator induction machines (referred to below as "Type 1"), such as disclosed in U.S. Pat. Nos. 3,183,431; 3,571,693; 4,229,689; 4,246,531; 4,305,001; 4,472,673; 4,701,691; 5,886,445; and 6,278,211. Single rotor-stator induction machines with two sets of stator windings of different pole counts (referred to below as "Type 2") are disclosed in U.S. Pat. Nos. 3,183,431; 5,028,804; and 5,239,251; and in other references listed therein. Reluctance machines (referred to below as "Type 3") are disclosed in U.S. Pat. No. 5,359,272 and by Xu et al. in "A Novel Wind-Power Generating System Using Field Orientation Controlled Doubly-Excited Brushless Reluctance Machine," IEEE, pp. 408–413 (January 1992). Brushless doubly-fed induction machines of Type 1 with reverse phase rotor connections, and of Type 2, have a rotor construction that tightly magnetically links the two stator winding sets through the rotor currents, so that the total number of poles is equal to the sum of the number of poles of the two stator winding sets. When they are synchronously controlled, their speed is proportional to the sum of the two stator frequencies, and the torques on the shaft from the two sets of stator currents are additive.

Brushless doubly-fed induction machines with one stator connected to the AC power line also require power to flow from the other doubly-fed connection, i.e., the other stator, to the control when motoring at sub-synchronous speeds or generating at super-synchronous speeds. The synchronous speed in revolutions per second, at which the frequency of power at the control connection to the stator is zero Hz, is equal to the quotient of twice the AC power line frequency divided by the sum of the number of poles of the two stator windings. Several of the above-noted references also teach that there is a discontinuity in the control of these machines at the speed above synchronous speed where the rotor frequency is equal to zero Hz. No power can be transferred between the stators by the machine when the rotor frequency is zero. The speed, in revolutions per second, at which this discontinuity occurs is equal to twice the AC power line frequency divided by the number of poles in the stator connected to the AC power line. Thus, the speed range over which a brushless doubly-fed induction machine can be smoothly controlled is from zero speed through the synchronous speed, and up to nearly the discontinuity speed, where the rotor frequency is zero.

The flux vector control techniques developed by Leonhard and others for wound rotor machines have been shown to apply also to brushless doubly-fed induction machines.

Papers describing these adaptations include: (1) D. Zhou et al., "Field Oriented Control Development for Brushless Doubly-Fed Machines," Proceedings of IEEE IAS Annual Meeting, San Diego (1996); (2) Xie Lun et al., "The Research of Brushless Doubly-Fed AC Excited Induction Motor Drive," Proceedings of Fifth International Conference on Electrical Machines and Systems (2001); and (3) B. Hopfensperger et al., "Combined Magnetizing Flux Oriented Control of the Cascaded Doubly-Fed Induction Machine," IEEE Proceedings on Electric Power Apparatus (July 2001). The foregoing references teach flux vector control of singly fed induction machines, doubly-fed wound rotor induction machines and brushless doubly-fed induction machines and inverter control of standalone generators like that shown in FIG. 1C. However, none of these prior art references discloses or suggests a method for control of brushless doubly-fed induction machines that achieves specific desirable operating capabilities for such a machine. It would clearly be desirable to eliminate the position sensor typically used in the prior art and determine rotor position from electrical variables. It would also be desirable to develop a method of substantially "bumpless" doubly-fed motor connection of such a machine to an AC line at or near the zero Hz speed.

There are certain advantages to operating a brushless doubly-fed induction machine with one stator shorted, which are not disclosed in the prior art. For example, it would be desirable to employ an inverter or flux vector control of one stator of a doubly-fed motor, with the other stator shorted, at sub-synchronous speeds. It would also be desirable to provide flux vector control of one stator of a doubly-fed motor, with the other stator shorted, and then measure the current in the shorted stator to determine the shaft speed and torque. Furthermore, it would be desirable to develop a method for substantially bumpless switching between a shorted stator sub-synchronous motor operating mode and a higher speed field oriented mode of operation with the stator that was previously shorted connected to the AC line. It would also be desirable to develop a method of maintaining a near-constant motor power factor at all operating loads applied to a brushless doubly-fed induction machine.

It would be desirable to develop a method of controlling a brushless doubly-fed induction machine to operate as either a standalone generator or as an AC line-connected generator. It would also be desirable to control the speed of an engine-driven generator as a function of load to operate the engine at the lowest speed that provides adequate torque margin for short-term overloads

SUMMARY OF THE INVENTION

In accord with the present invention, an electronic power converter configured as a three-phase current regulator supplies current to the first stator of a brushless doubly-fed induction machine with the second stator open, shorted, connected to an AC line, or connected to a load. Control of the current vector into the first stator controls the torque of the machine when used either for motoring or generating power with the second stator connected to an AC line. The electronic power converter is configured as an inverter when the machine operates as an independent generator that is not connected to the AC line.

A processor is programmed to operate the machine as a speed or torque controlled motor, from zero speed to a speed that is greater than a synchronous speed of the machine. At the synchronous speed, the first stator input frequency is zero when the second stator is connected to the AC power line. A speed range from zero up to almost twice the synchronous speed with full torque can be attained at all speeds with a processor based controller that is rated for about half the motor output power at maximum speed. In addition, a speed range from zero to one and a half times the synchronous speed can be attained in variable torque applications, with torque proportional to the square of speed, using a processor-based based controller rated at about one-third the motor output power at maximum speed.

For variable speed drive applications requiring continuous torque at all speeds, a processor-based control 50 in accord with the present invention operates the machine 40 as a flux vector controlled doubly-fed motor, with AC switch 16 connected to AC power line 14 closed (see FIG. 2A). The flux vector control continuously maintains stator S1 flux orientation relative to the applied AC power line voltage within the capability of the controller, even for suddenly applied loads or loads beyond the torque capacity of the motor. Full torque capability is provided by the control at all speeds from zero to maximum speed, with no switching of modes after the initial AC line connection.

FIGS. 3A, 3B, and 3C are plots 76 and 78 of power, a plot 80 of stator S1 frequency and a plot 82 of voltage—all versus speed, for a typical dual 4-pole brushless doubly-fed induction motor 40 connected to 60 Hz AC power line 14. Both stator windings are identical, in this example, and processor-based control 50 is rated at about 50% of the motor rating at maximum speed. The synchronous speed is 900 RPM, and the rated maximum speed is about 1750 RPM, in this example. Operation is started at zero speed by controlling the S1 excitation with AC switch 16 open to synchronize the generated S2 voltage on taps 18 with AC power line 14, then automatically closing AC switch 16 to accomplish bumpless power application to the motor. Control 50 is then automatically switched to a doubly-fed flux vector motor control mode for operation over the speed range of zero to about full rated speed. AC power line 14 supplies power 78 proportional to output torque to stator S2 at all speeds. Neglecting losses, this power ranges from zero at no load to about 50% of the rated motor output power at rated torque. Again neglecting losses, the controller absorbs power 76 proportional to the product of torque and the difference between the synchronous speed and the operating speed from stator S1 at speeds below the synchronous speed. This power absorption ranges from 50% of motor rating at rated torque and zero speed to zero at synchronous speed. The controller supplies power 76 proportional to the difference between the synchronous speed and the operating speed to S1, at speeds above synchronous speed. This power ranges from zero at synchronous speed to almost 50% of motor rating at about the full rated speed and rated load. Control 50 output frequency 80 ranges from 60 Hz in the rotation direction opposite to that of AC power line 14 at zero speed, to zero at half speed, and almost 60 Hz in the AC line rotation direction at maximum speed of about 1750 RPM. Control 50 output voltage 82 ranges from 100% voltage output at zero speed to zero at half speed, and to 100% output at maximum speed. Electronically reversing the phase of the S1 input and reversing the phase of the AC line voltage applied to S2 prior to synchronization reverses the direction of rotation of the machine.

For constant torque variable speed drive applications that can tolerate a momentary zero torque output when changing operating modes, the dual-mode control of the present invention provides a substantial cost reduction by eliminating the need for controller 50 to absorb power below synchronous speed. This capability is accomplished with the power circuit block diagram of FIG. 2B, where processor-based control 50 operates machine 60 with S2 shorted by a shorting switch 62 below synchronous speed and switches to flux vector controlled doubly-fed motor control mode with S2 connected to AC power line 14, for operation above synchronous speed. FIGS. 4A, 4B, and 4C shows plots 90 and 92 of power, a plot 96 of stator S1 frequency, and a plot 98 of voltage—all versus speed, for dual 4-pole brushless doubly-fed motor 60 connected to 60 Hz AC power line 14. The S1 and S2 windings are identical and controller 50 is rated at about 50% of the motor rating at maximum speed. Operation is started at or about zero speed by closing shorting switch 62 with AC switch 16 open (as indicated in a box 86). The S1 frequency shown in plot 96 and the voltage shown in plot 98 are both proportional to speed up to the half speed level, and the controller output shown in plot 92 is proportional to motor output power, reaching a maximum of 50% of rated motor power at synchronous speed and rated load, neglecting losses. At about synchronous speed, shorting switch 62 is opened, the S1 excitation is controlled by the processor-based control 50 to synchronize the generated S2 voltage at taps 18 with AC power line 14. AC switch 16 is then closed to accomplish bumpless AC line power application to the motor. Processor-based control 50 then switches to doubly-fed flux vector motor control mode, as indicated in the portion of the plot under a box 88, for operation over the range from synchronous speed to about full rated speed, as described above. The direction of rotation is electronically controllable up to half speed; the two directions of rotation require opposite phasing of the AC line voltage applied to S2 prior to synchronization and closing of AC switch 16.

For variable torque applications such as fan and pump drives, the number of turns on the stator S1 of motor 60 in FIG. 2B is doubled, which halves the speed range at full motor excitation to give the speed-torque capability shown in FIG. 5A. Maximum speed with this winding is 1350 RPM, limited by the available voltage from the controller, as shown by a plot 106 in FIG. 5C; synchronous speed is 900 RPM in this example. Excitation weakening in the middle third of the speed range reduces the torque as shown in a plot 102, but provides a minimum of about 50% of full torque in this range as needed for variable torque loads, with a controller rated at about one-third of the full rated motor power. Full torque shown in plot 102 is available in the lower third of the speed range for starting the load and in the upper third of the range where the running load is high. Starting and operation up to about one half synchronous speed, in the region under box 86, are as described above, except that the S1 voltage shown in plot 106 of FIG. 5C is twice that in the configuration used for the plots of FIGS. 4A, 4B, and 4C. Controller output frequency shown in a plot 104 and the voltage shown in a plot 106 are proportional to motor speed up to the half-synchronous speed level. Controller output power is proportional to the product of speed and load, reaching a maximum of 33% of rated motor power at the half-synchronous speed level and rated load, neglecting losses. From half-synchronous speed to synchronous speed, the motor excitation is progressively reduced with increasing speed to maintain near-maximum voltage, as shown in plot 106 and to provide constant power capability equal to about 33% of the motor rating. In this range, controller output power is proportional to motor power output, reaching about 33% of motor rating maximum, neglecting losses. Switching to doubly-fed control with the AC switch closed, as indicated in box 88, at or near synchronous speed, and operation above synchronous speed are as described above.

The AC line supplies power proportional to output torque to stator S2 at all speeds above synchronous speed, once the AC switch is closed. Neglecting losses, this power ranges from zero at no load to about 67% of the full rated motor output power at rated torque. Again neglecting losses, the controller supplies power proportional to the product of torque and the difference between synchronous speed and operating speed to stator S1 at speeds above synchronous speed. This power ranges from zero at synchronous speed, to about 33% of motor rating at maximum speed and rated load. The direction of rotation is electronically controllable up to synchronous speed. The two directions of rotation require opposite phasing of the AC line voltage applied to S2 prior to synchronization and closing of the AC switch.

The machine is operated as a variable-speed constant-frequency generator at a speed range above and below synchronous speed (the speed at which the first stator input frequency is zero). A speed range of ±25% synchronous speed can be attained with a control rated at 20% of the generator output power at maximum speed. Other speed ranges require a controller rating proportional to the speed variation from synchronous speed.

The processor-based control of this invention enables machine 40 to generate power into AC power line 14 (co-generation) by operating the machine as a flux vector controlled doubly-fed generator, as shown in FIG. 2A, with processor-based control 50 configured as a three-phase current regulator and AC switch 16 closed. The flux vector control mode continuously maintains stator S1 flux orientation relative to the applied AC power line voltage within the capability of control 50, even for suddenly applied electrical loads, or loads beyond the torque capacity of the prime mover driving the shaft of the machine. Synchronization with the AC line before initiating generation is accomplished by processor-based control 50 at any speed in the operating range, by automatically controlling the S1 excitation to synchronize the generated S2 voltage at taps 18 with AC power line 14, and then closing AC switch 16 to accomplish bumpless connection of the generator to the AC power line. Control 50 then switches to doubly-fed flux vector mode, to control the current generated and the torque over the generating speed range.

FIGS. 6A, 6B, and 6C illustrate a plot 112 of control power, a plot 114 of total power, a plot 116 of stator S1 frequency, and a plot 118 of voltage—all versus speed, for dual 2-pole brushless doubly-fed generator 40 connected to 60 Hz AC power line 14. Stator S1 is wound with four times the number of turns on S2, giving it four times as high a voltage constant and limiting the generating speed range to ±25 percent of the synchronous speed (e.g., 1800 RPM). Stator S2, which is connected to the AC line, supplies about 80% of the generated power (shown in a plot 110) provided to the AC line by the machine at maximum speed, and the control supplies about 20% of the output power (as shown in plot 112) from S1. For the same torque load on the prime mover, S2 continues to supply about 80% of the maximum speed power at any lower speed, while the control reduces the power supplied from S1 with speed to zero at synchronous speed and to a negative level below synchronous speed. With the same prime mover torque load applied at a minimum speed of about three quarters synchronous speed, the control absorbs 20% of the maximum speed power (shown in plot 112) from S1. Stator S2 continues to supply about 80% of the power (as shown in plot 110) to the AC line, resulting in a net generated power (shown in a plot 114) of about 60% of that available at the maximum speed of about 1.25 times synchronous speed (i.e., 2250 RPM, in this example).

In accord with the present invention, a processor-based control 72 of FIG. 2C operates machine 70 for standalone power generation in applications without an AC line, by functioning as an inverter. A direct current (DC) bus starting power source 42 provides control power to the inverter and other controls until the generator output in lines 34 is sufficiently great to supply the inverter and control power output from stator S2. The plots of FIGS. 6A, 6B, and 6C and the above discussion of power distribution between the stators are also applicable to standalone power generator operation.

The control can be remotely switched between these two modes of operation to enable co-generation by the machine when an AC line is available, and standalone generator operation when AC line power is unavailable. In accord with the present invention, for multiple installations of such machines, one machine can be operated in the standalone mode to establish an AC line voltage and frequency while the other machines are operated in the co-generation mode.

BRIEF DESCRIPTION OF THE DRAWING FIGURES

The foregoing aspects and many of the attendant advantages of this invention will become more readily appreciated as the same becomes better understood by reference to the following detailed description, when taken in conjunction with the accompanying drawings, wherein.

Figure 1A:
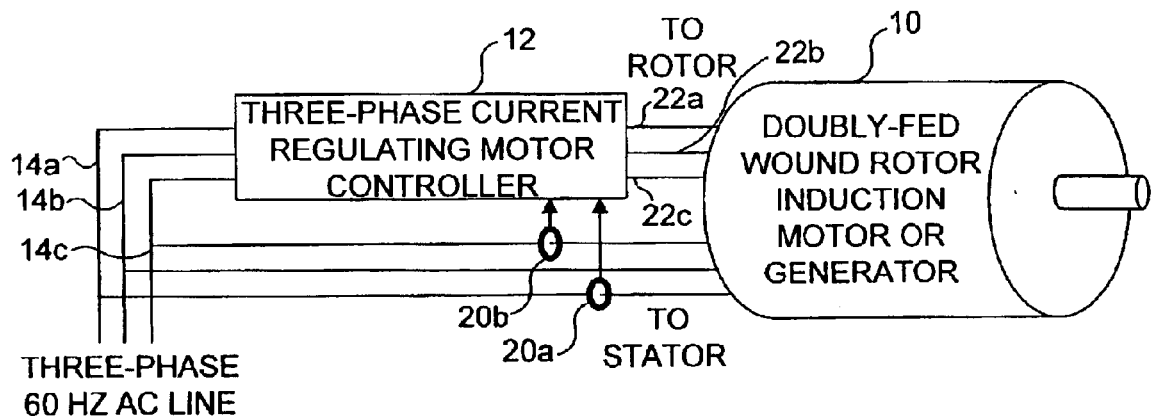
FIG. 1A (Prior Art) is a power circuit block diagram of a doubly-fed wound rotor induction machine, and a doubly-fed flux vector control for the machine when used as a motor or generator, with its stator connected to an AC power line.
Figure 1B:
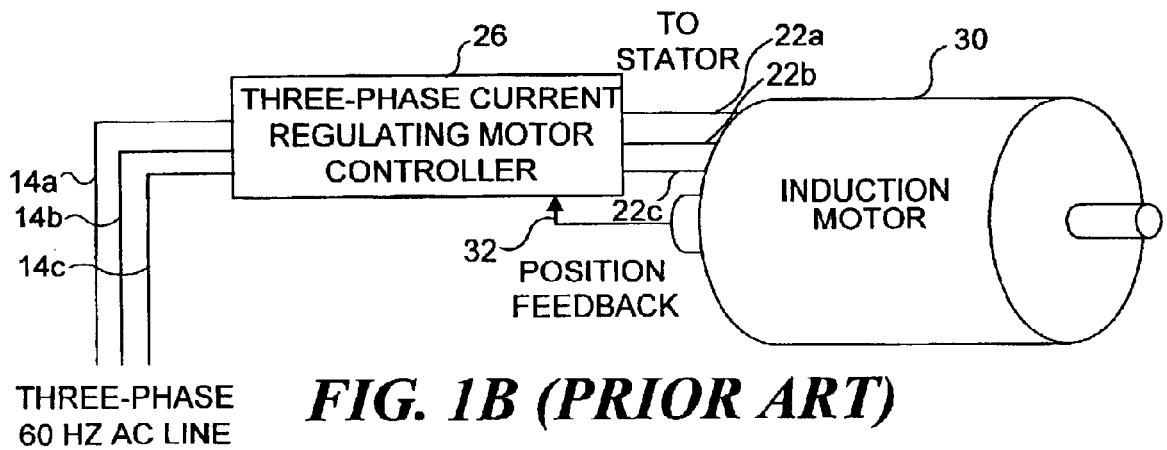
FIG. 1B (Prior Art) is a power circuit block diagram of a flux vector controlled singly-fed induction motor.
Figure 1C:
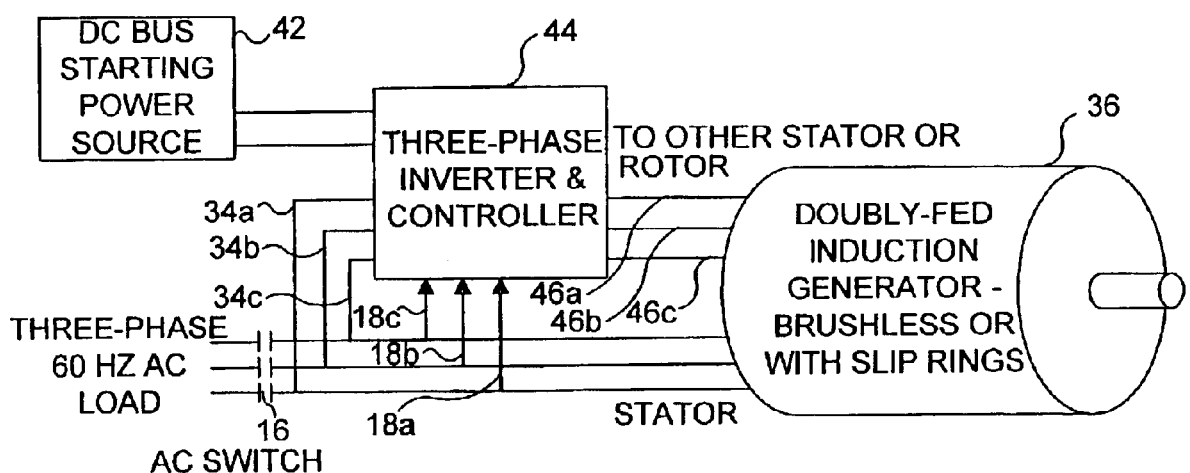
FIG. 1C (Prior Art) is a power circuit block diagram of a doubly-fed induction generator, brushless or with slip rings, and an inverter for control of the generator as a variable-speed constant-frequency generator with its stator connected to a load.
Figure 2A:
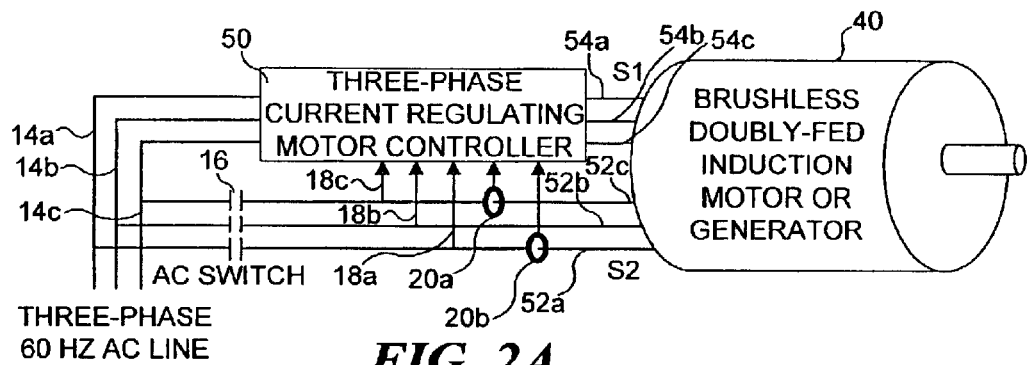
FIG. 2A is a power circuit block diagram of a brushless doubly-fed induction machine and a doubly-fed flux vector control for the machine, when used as either a motor or a generator, with one stator connected to an AC power line through a switch.
Figure 2B:
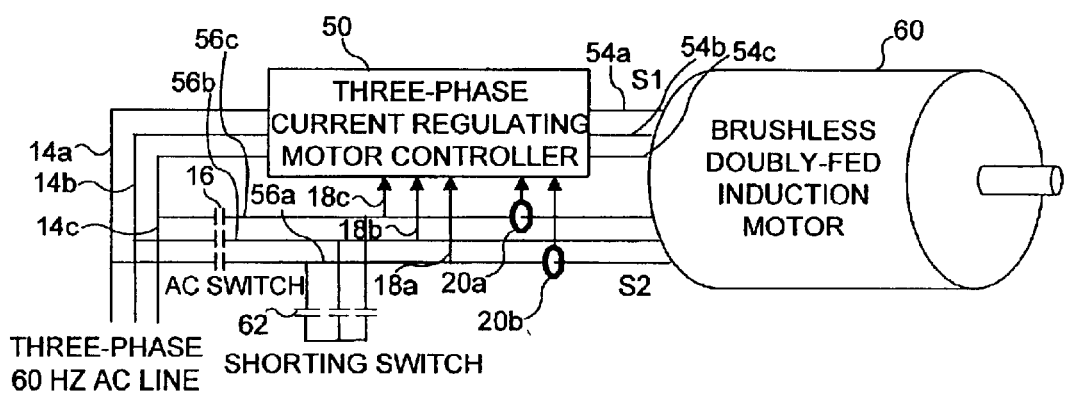
FIG. 2B is a power circuit block diagram of a brushless doubly-fed induction motor, and a dual-mode control that provides singly-fed induction motor operation with the second stator shorted at sub-synchronous speeds, and, when operating at super-synchronous speeds, provides doubly-fed flux vector control of the motor with the second stator connected to the AC power line through a switch.
Figure 2C:
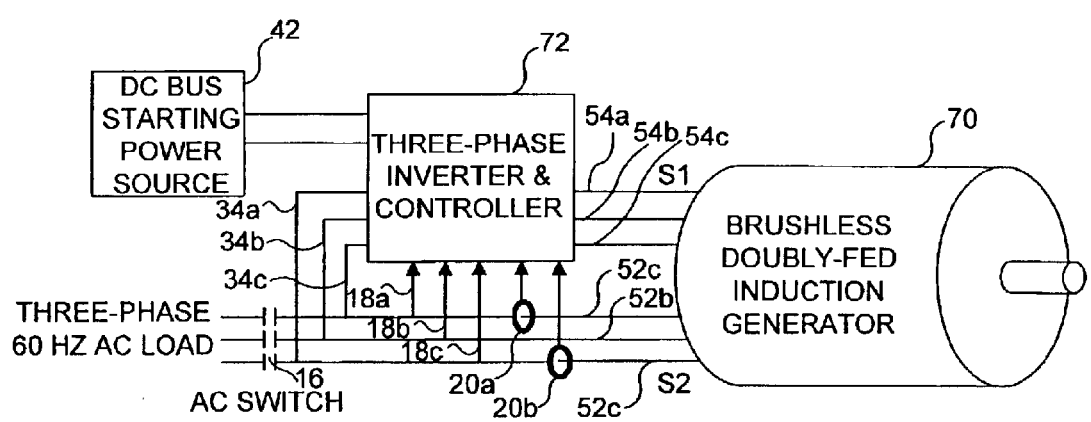
FIG. 2C is a power circuit block diagram of the brushless doubly-fed induction generator and inverter for variable-speed constant-frequency control of the generator, with the second stator connected to a load.
Figure 3A:
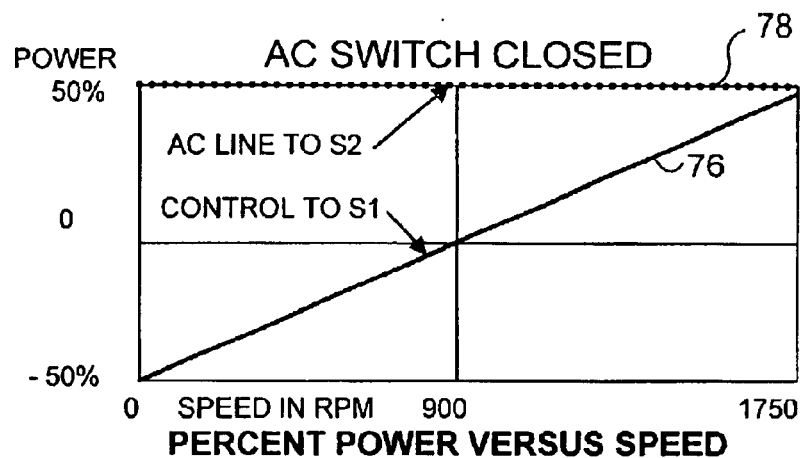
Figure 3B:
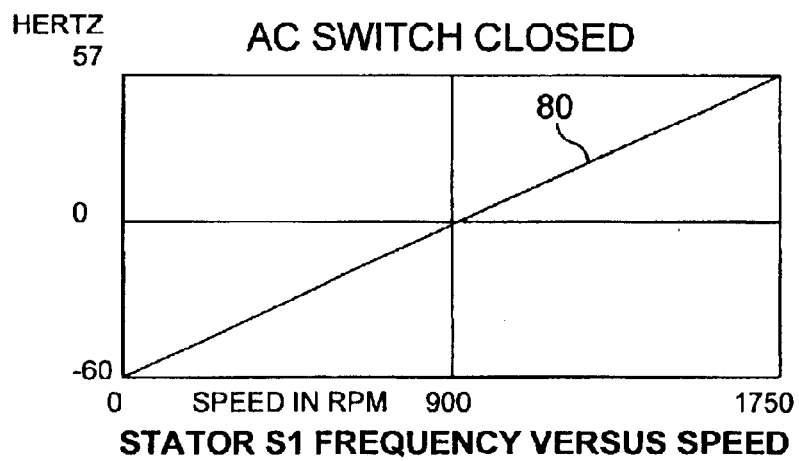
Figure 3C:
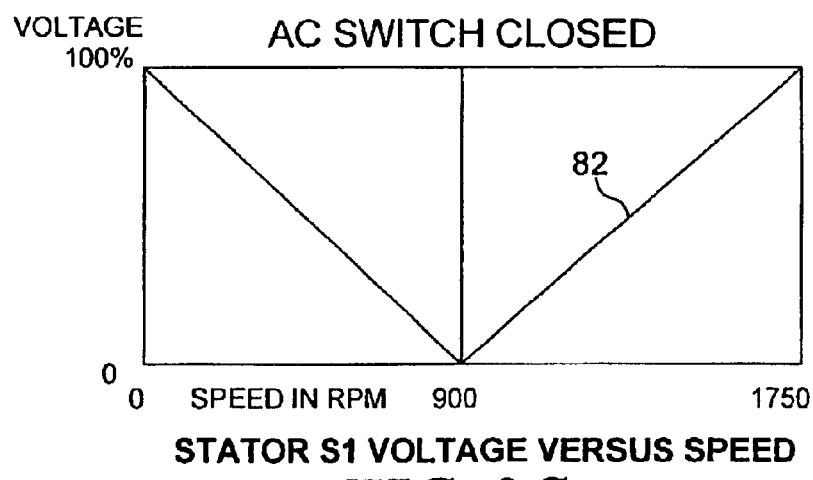
Figure 4A:
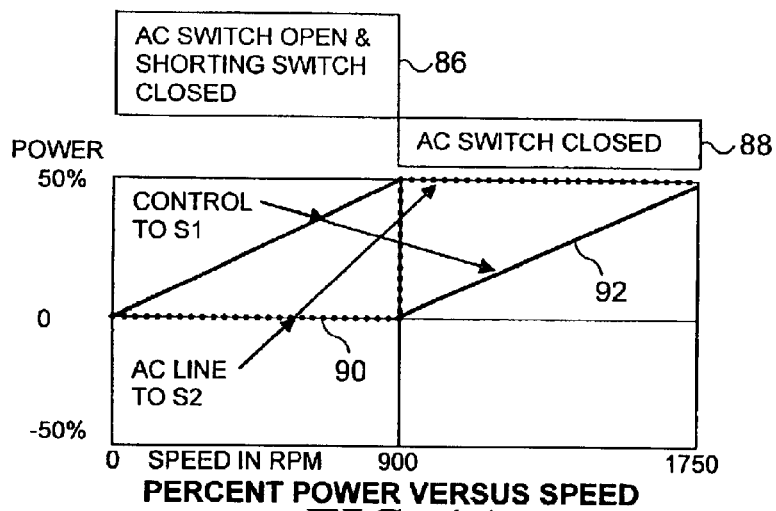
Figure 4B:
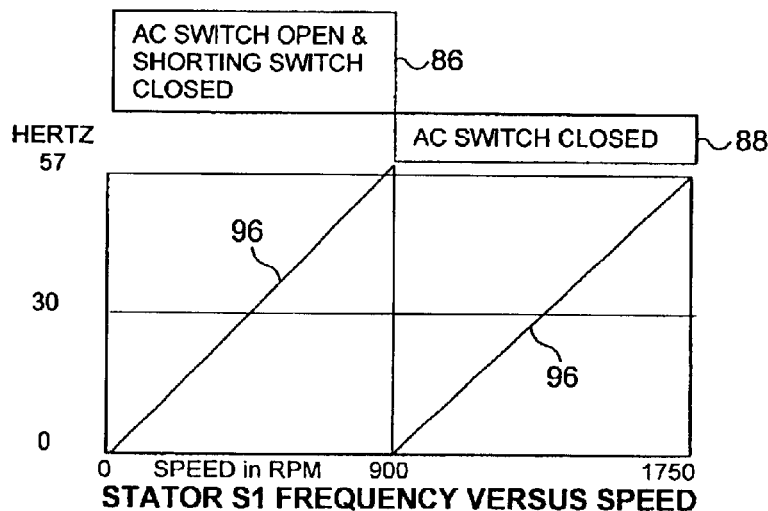
Figure 4C:
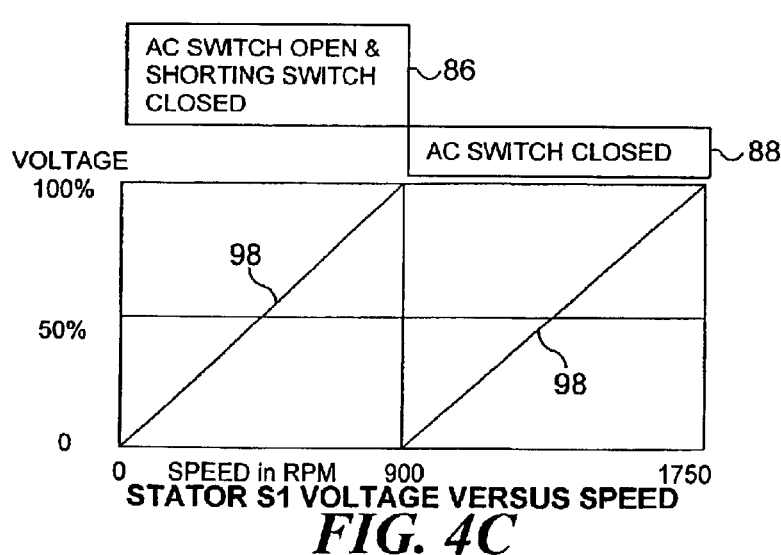
Figure 5A:
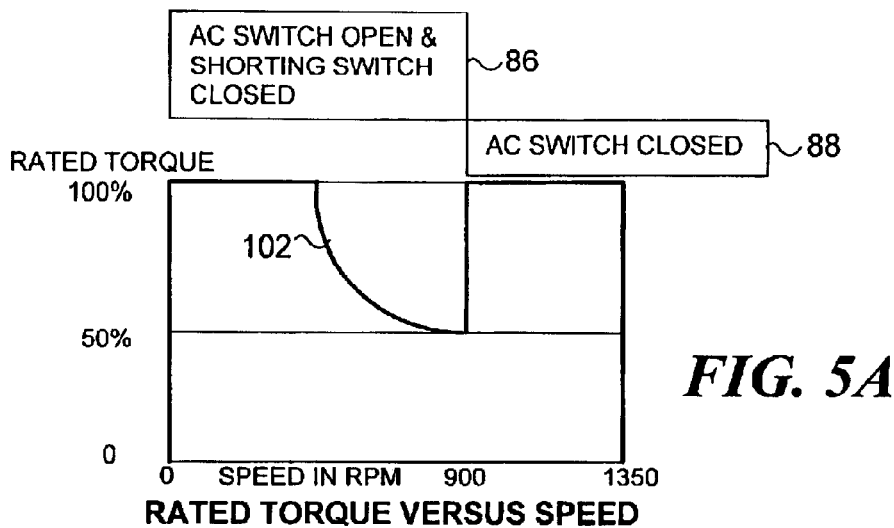
Figure 5B:
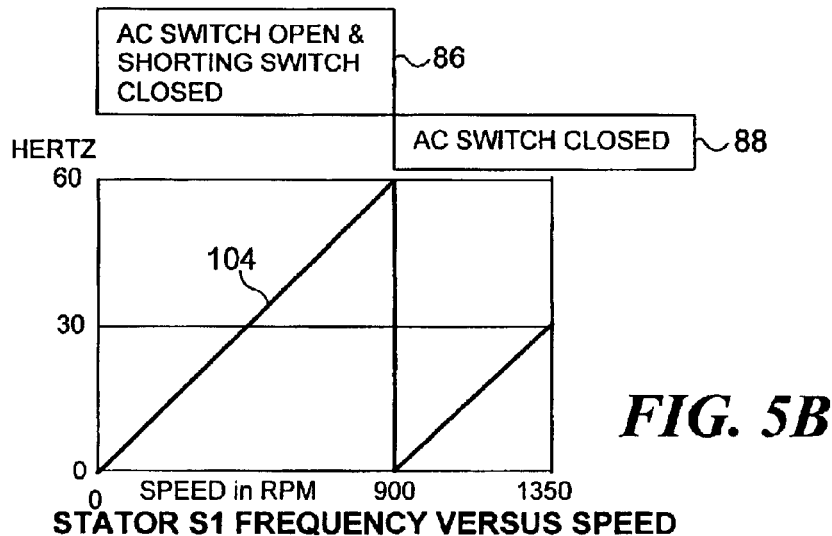
Figure 5C:
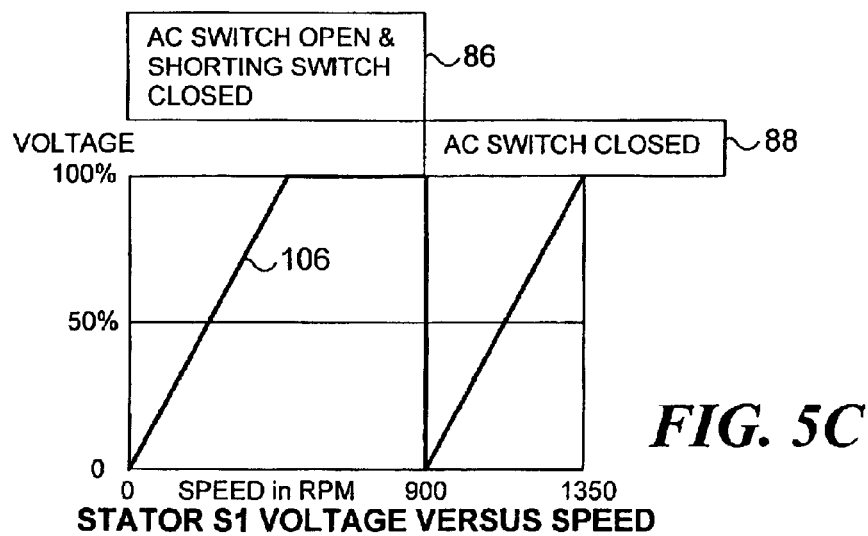
Figure 6A:
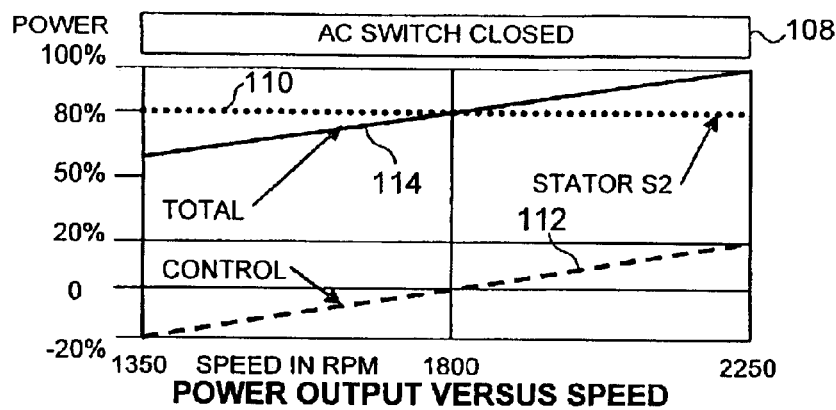
Figure 6B:
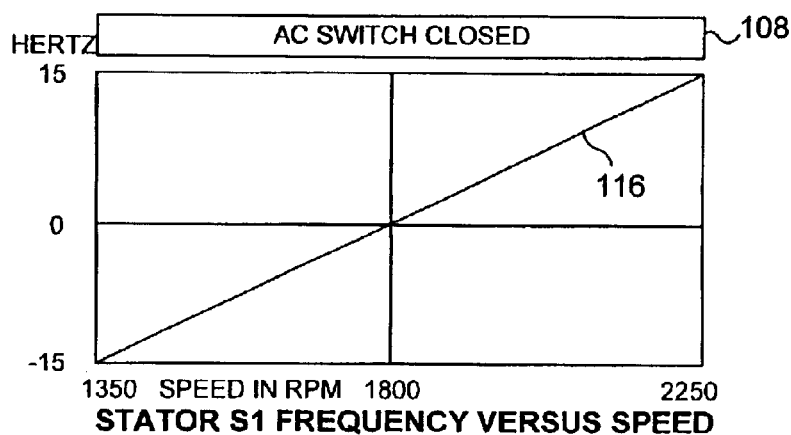
Figure 6C:
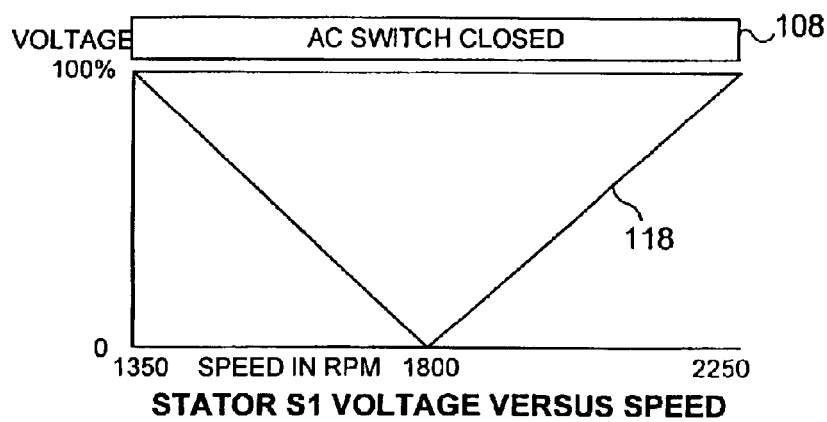
Figure 7:
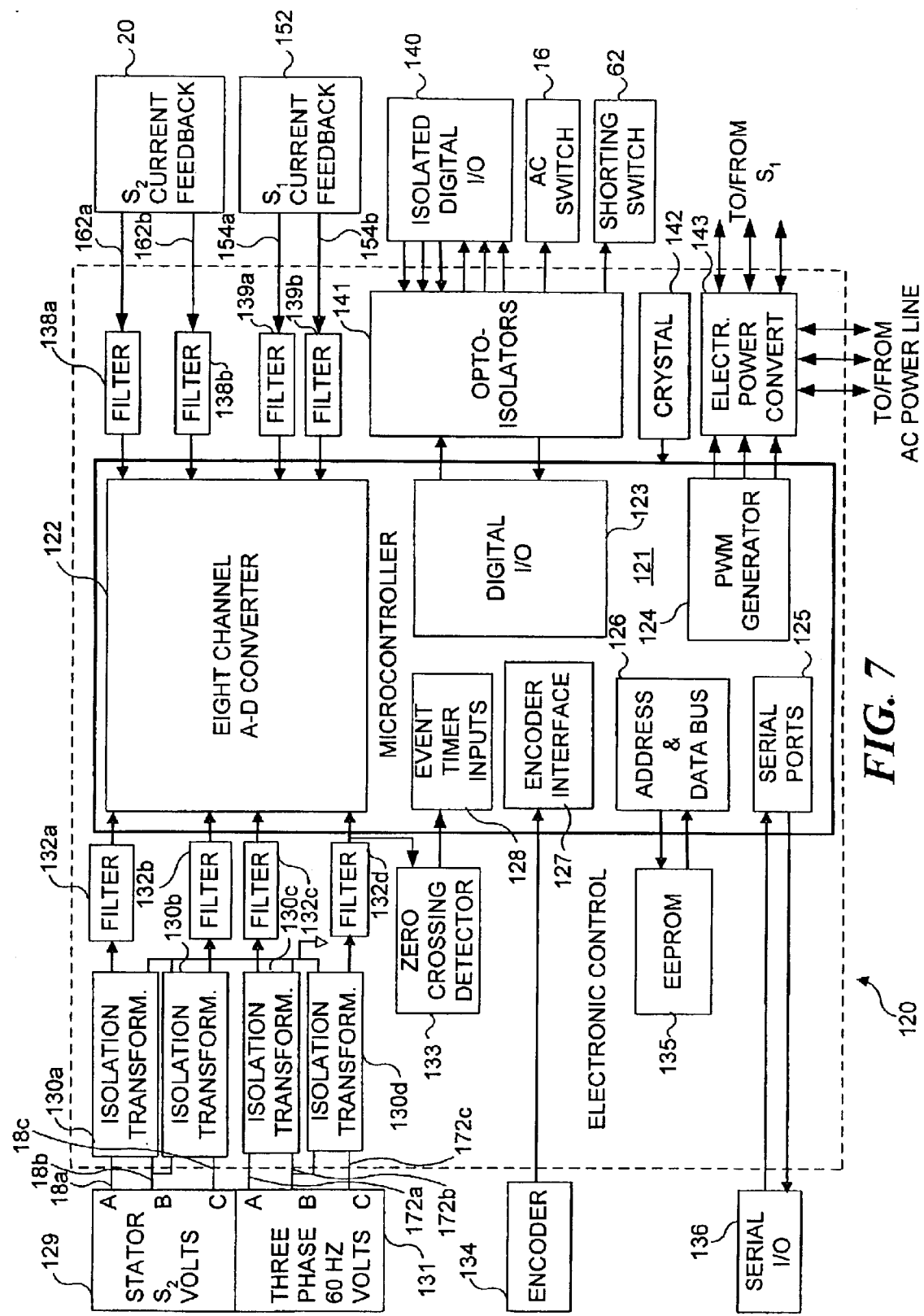
Figure 8:
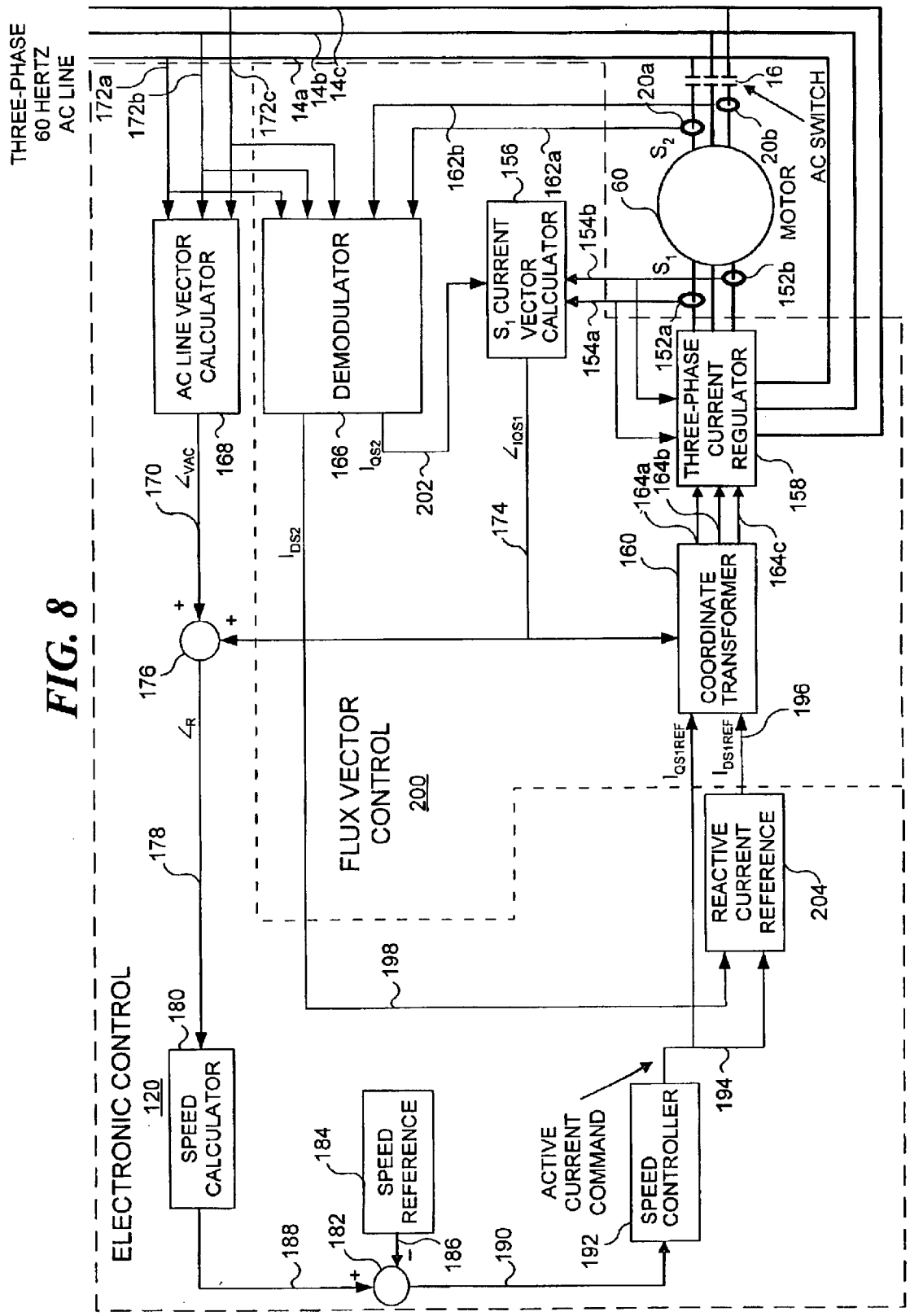
Figure 9:
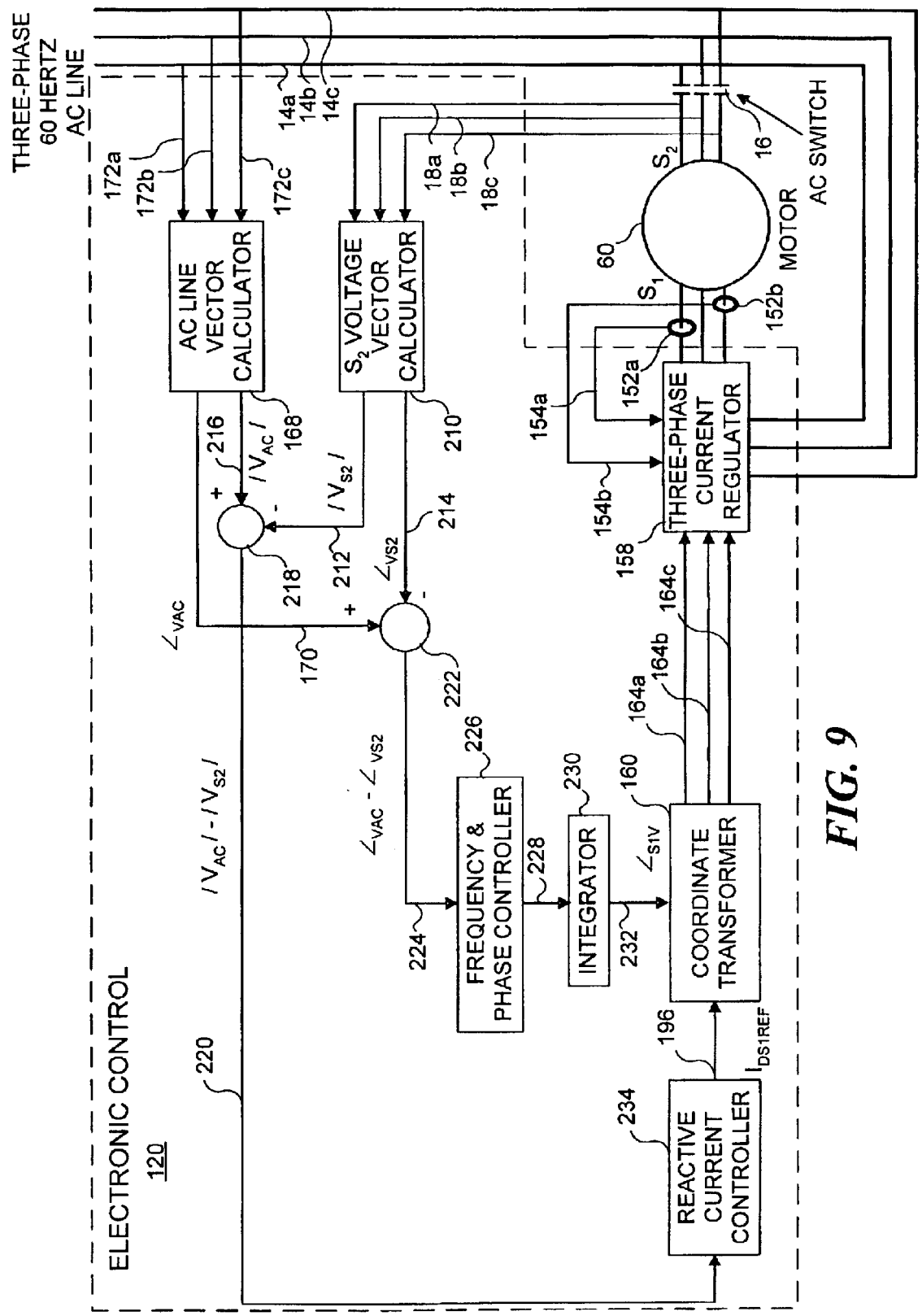
Figure 10:
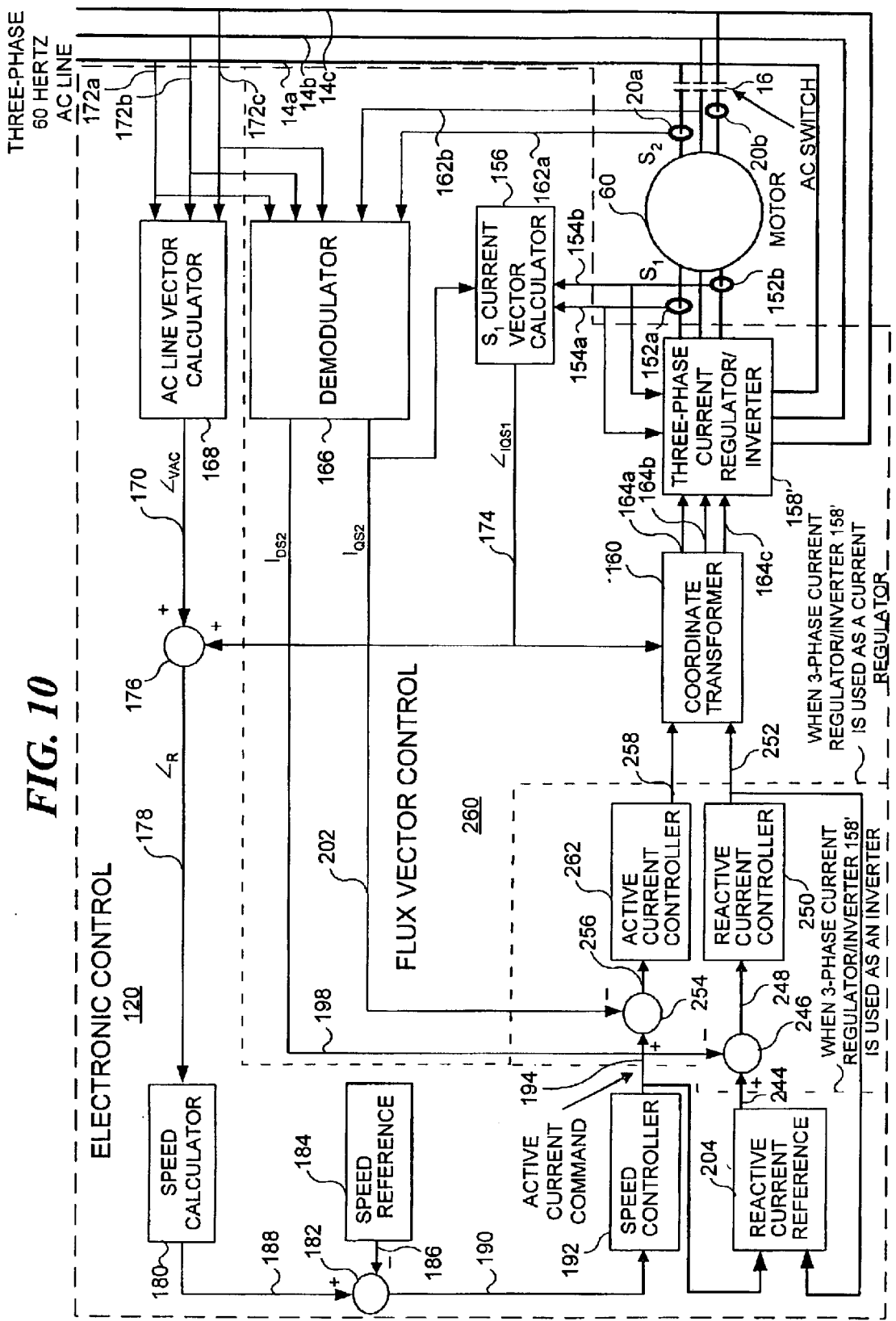
Figure 11:
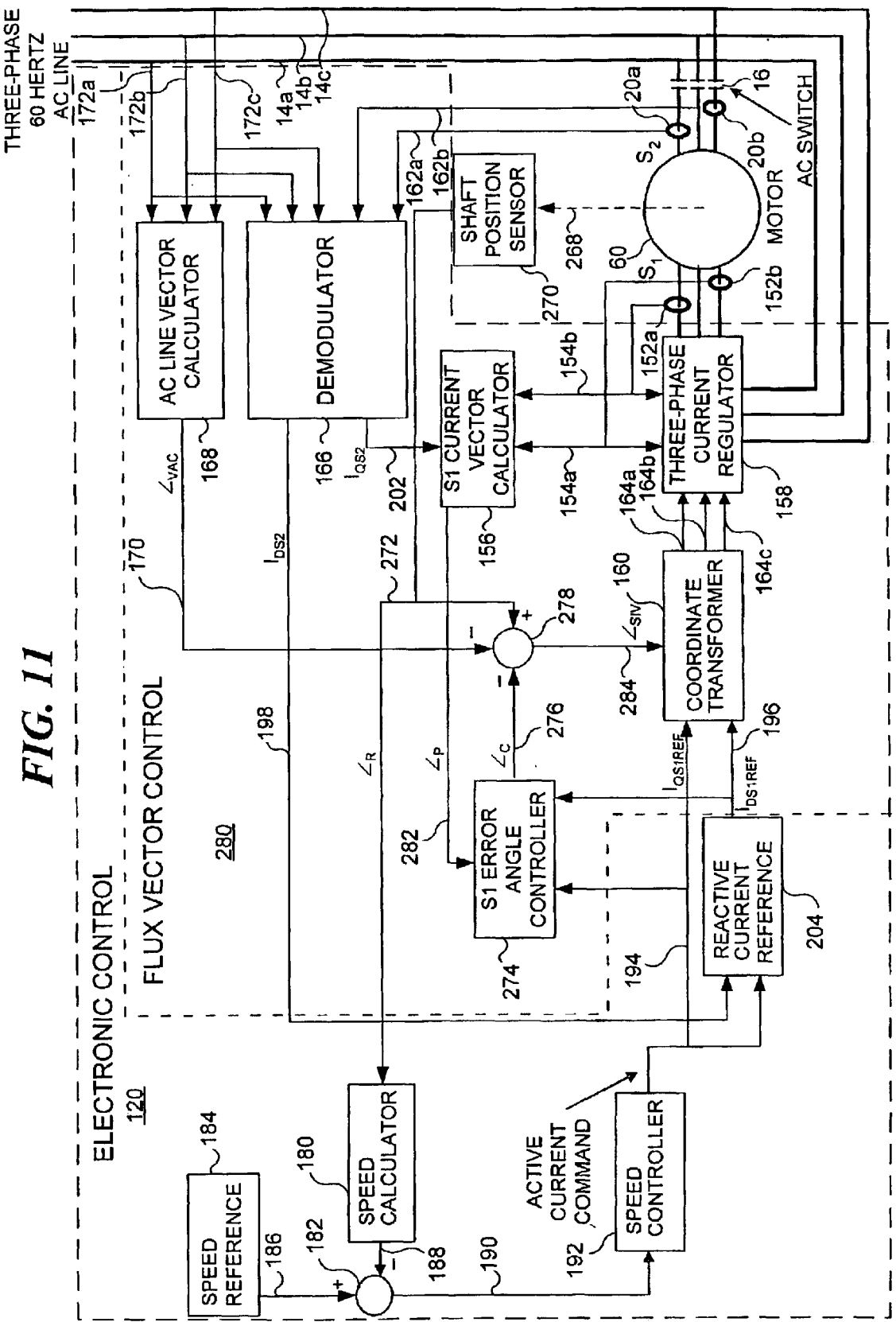
Figure 12:
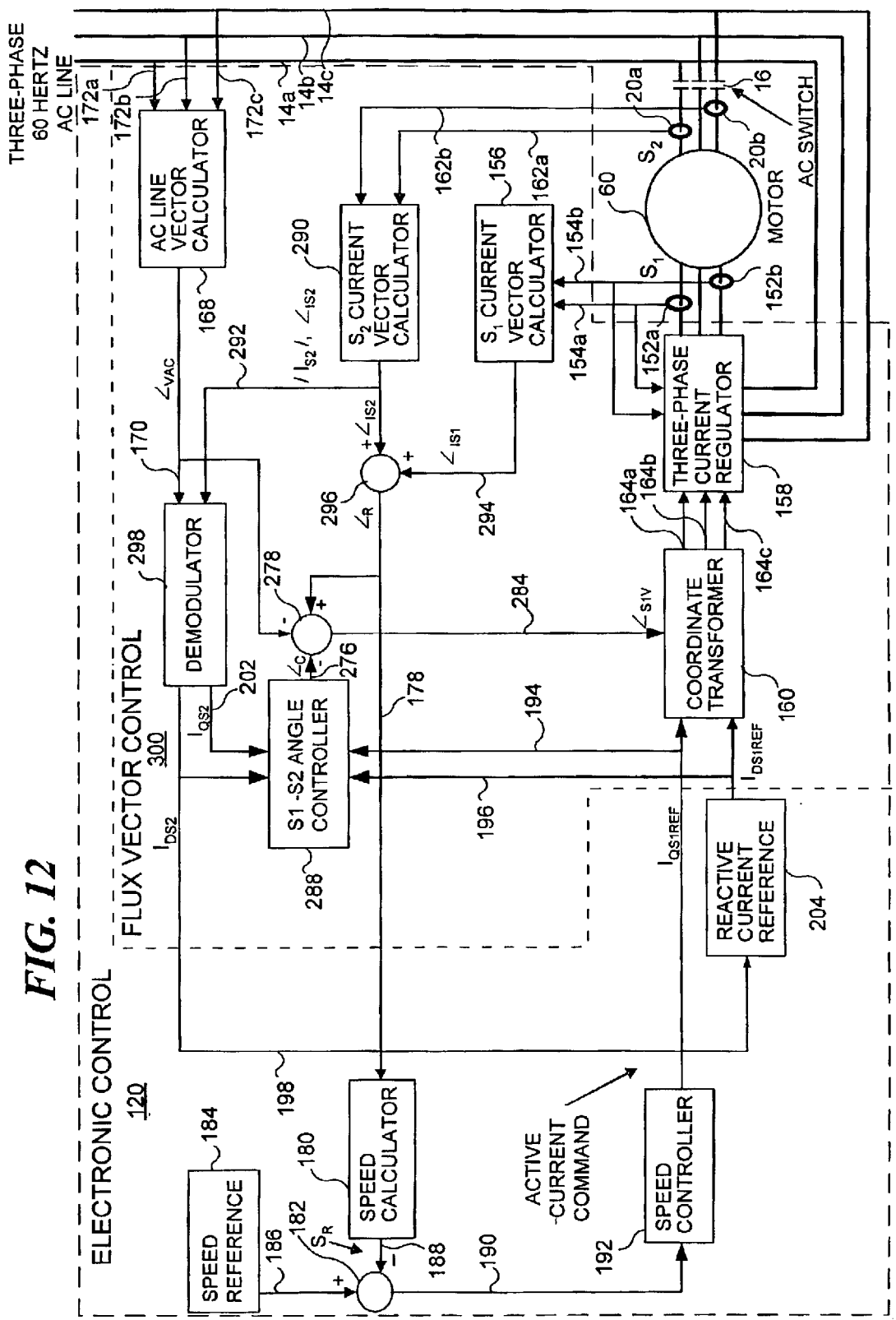
Figure 13:
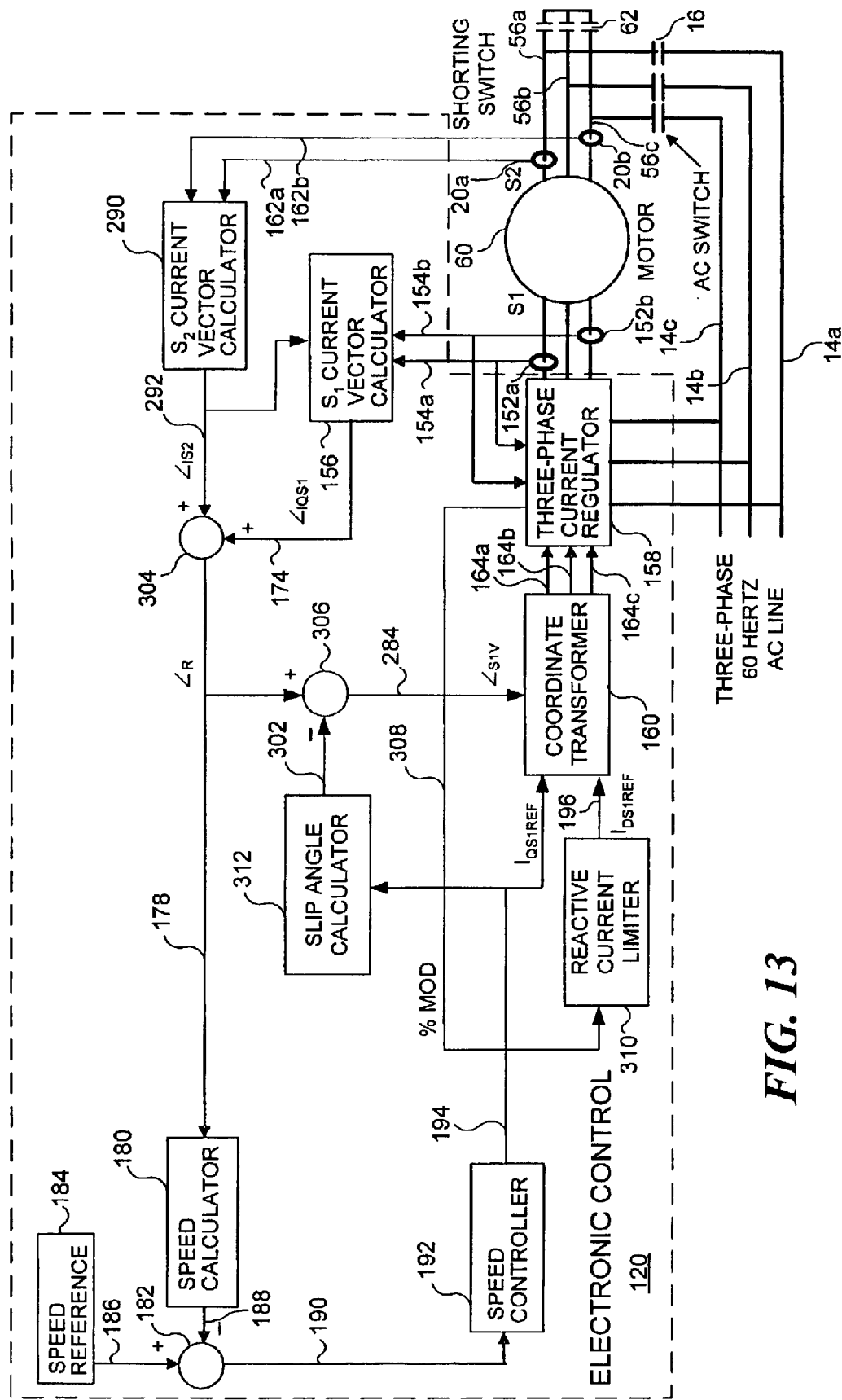

FIGS. 3A, 3B, and 3C respectively are plots of power versus speed, first stator voltage versus speed, and frequency versus speed for a dual 4-pole brushless doubly-fed induction machine with an equal number of turns in each stator winding, when controlled using the control of FIG. 2A, which provides a constant-torque drive with a zero to 1750 RPM speed range;

FIGS. 4A, 4B, and 4C respectively are plots of power versus speed, frequency versus speed, and first stator voltage versus speed for a dual 4-pole brushless doubly-fed induction motor with an equal number of turns in each stator winding, when controlled with the dual-mode control of FIG. 2B, which provides a constant-torque drive with a zero to 1750 RPM speed range;

FIGS. 5A, 5B, and 5C respectively are plots of torque versus speed, first stator frequency versus speed, and first stator voltage versus speed for a dual 4-pole brushless doubly-fed induction motor with twice the number of second stator winding turns on the first stator S1, which provides a variable torque drive with a zero to 1350 RPM speed range, when dual-mode controlled with the control of FIG. 2B;

FIGS. 6A, 6B, and 6C are plots of power output versus speed, frequency versus speed, and controlled first stator voltage versus speed, for a dual 2-pole brushless doubly-fed induction generator with four times the number of second stator winding turns on the first stator, when controlled by the control of FIG. 2A or 2C, which provide a speed range of 1350 to 2250 RPM;

FIG. 7 is a functional block diagram of a processor-based electronic control used in each of the embodiments of the present invention;

FIG. 8 is a block diagram of a preferred embodiment of a control and brushless doubly-fed induction motor for doubly-fed flux vector controlled operation, with the second stator connected to the AC power line;

FIG. 9 is a block diagram of a preferred embodiment of a control and motor in which the AC power line is connected to the second stator prior to doubly-fed flux vector control of the motor;

FIG. 10 is a block diagram of an alternate embodiment of the control and motor for doubly-fed flux vector controlled operation, wherein the second stator is connected to the AC power line;

FIG. 11 is a block diagram of a second alternate embodiment of the control and motor for doubly-fed flux vector controlled operation, using a shaft position sensor, wherein the second stator is connected to the AC power line;

FIG. 12 is a block diagram of a third alternate embodiment of the control and motor for doubly-fed flux vector controlled operation, employing a different method of electronic shaft position calculation, wherein the second stator is connected to the AC power line;

FIG. 13 is a block diagram of a preferred embodiment for flux vector control of the motor with the second stator shorted.

Figure 14:
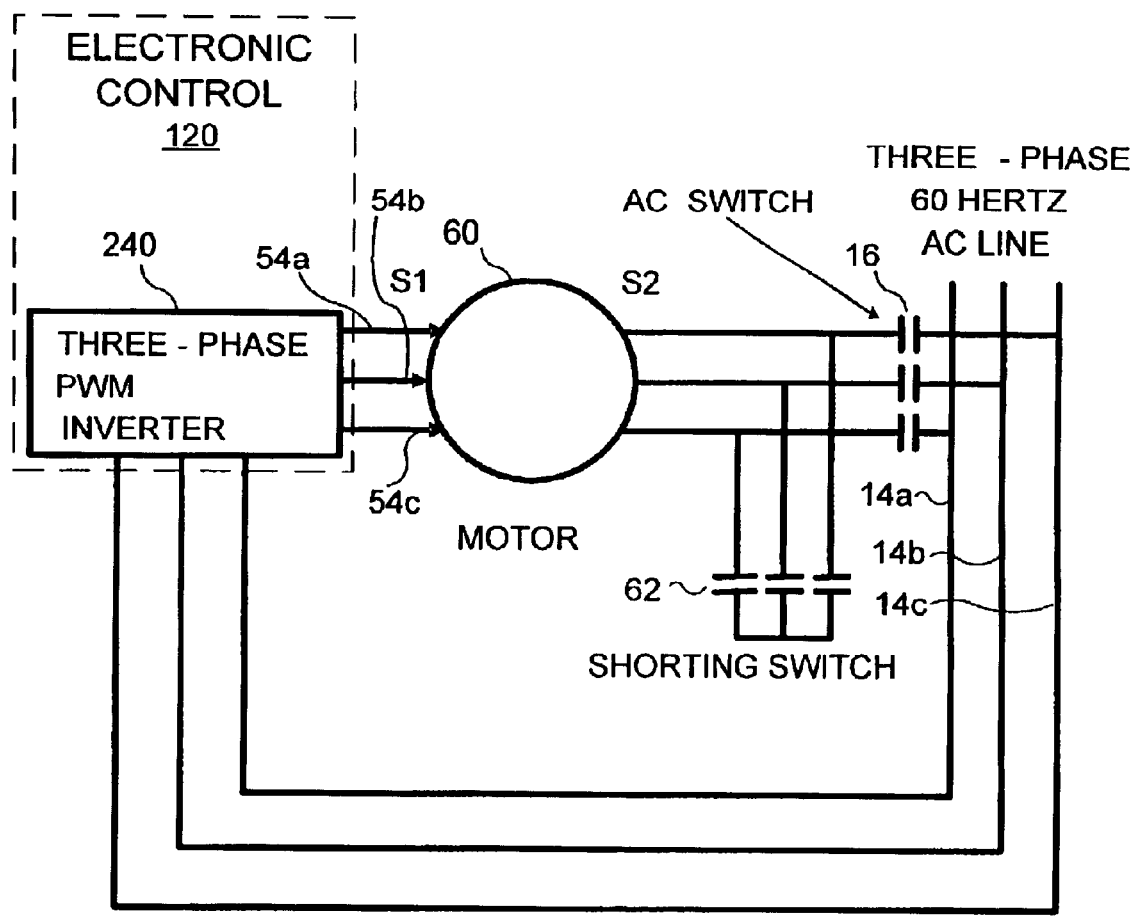
Figure 15:
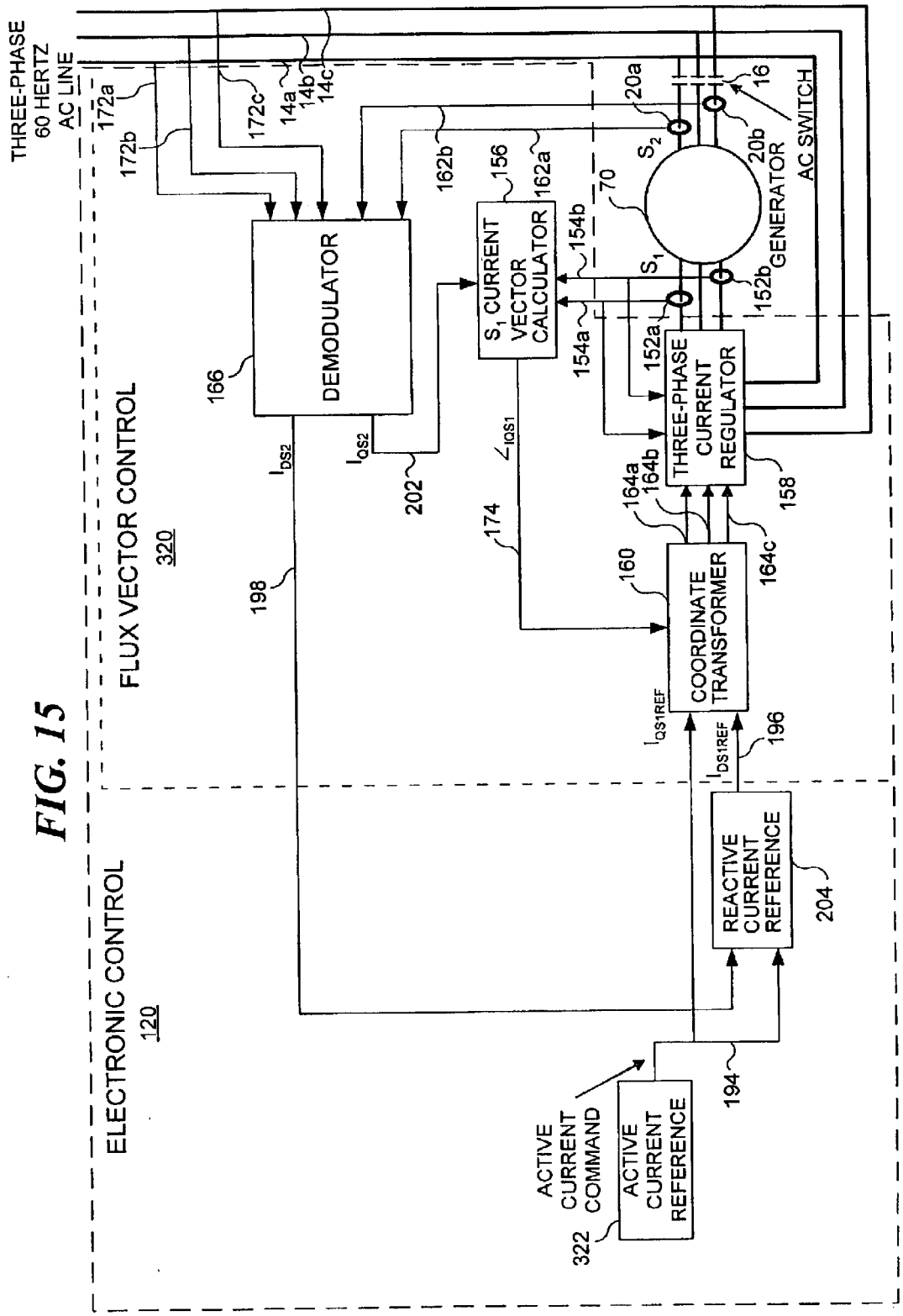
Figure 16:
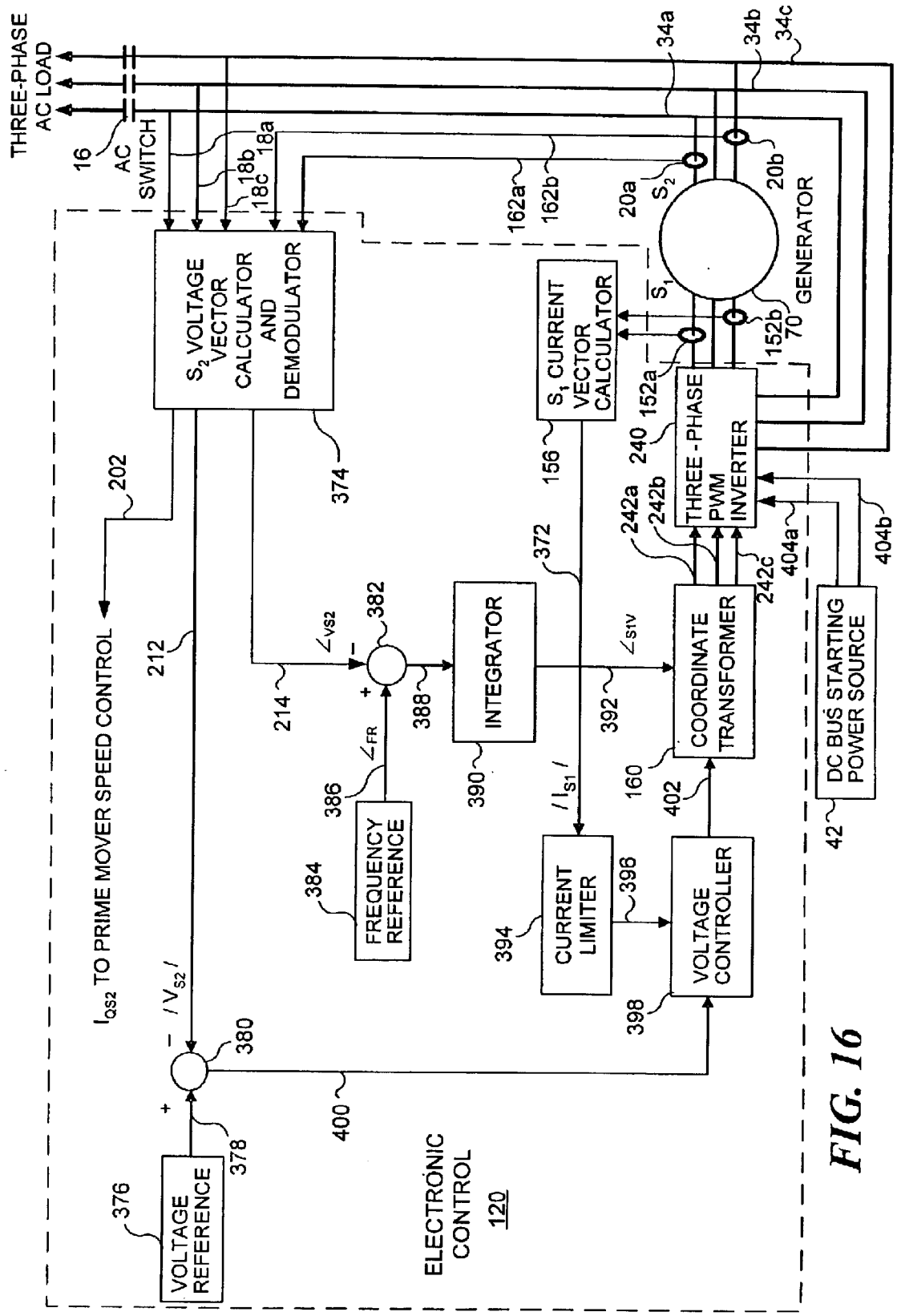
Figure 17:
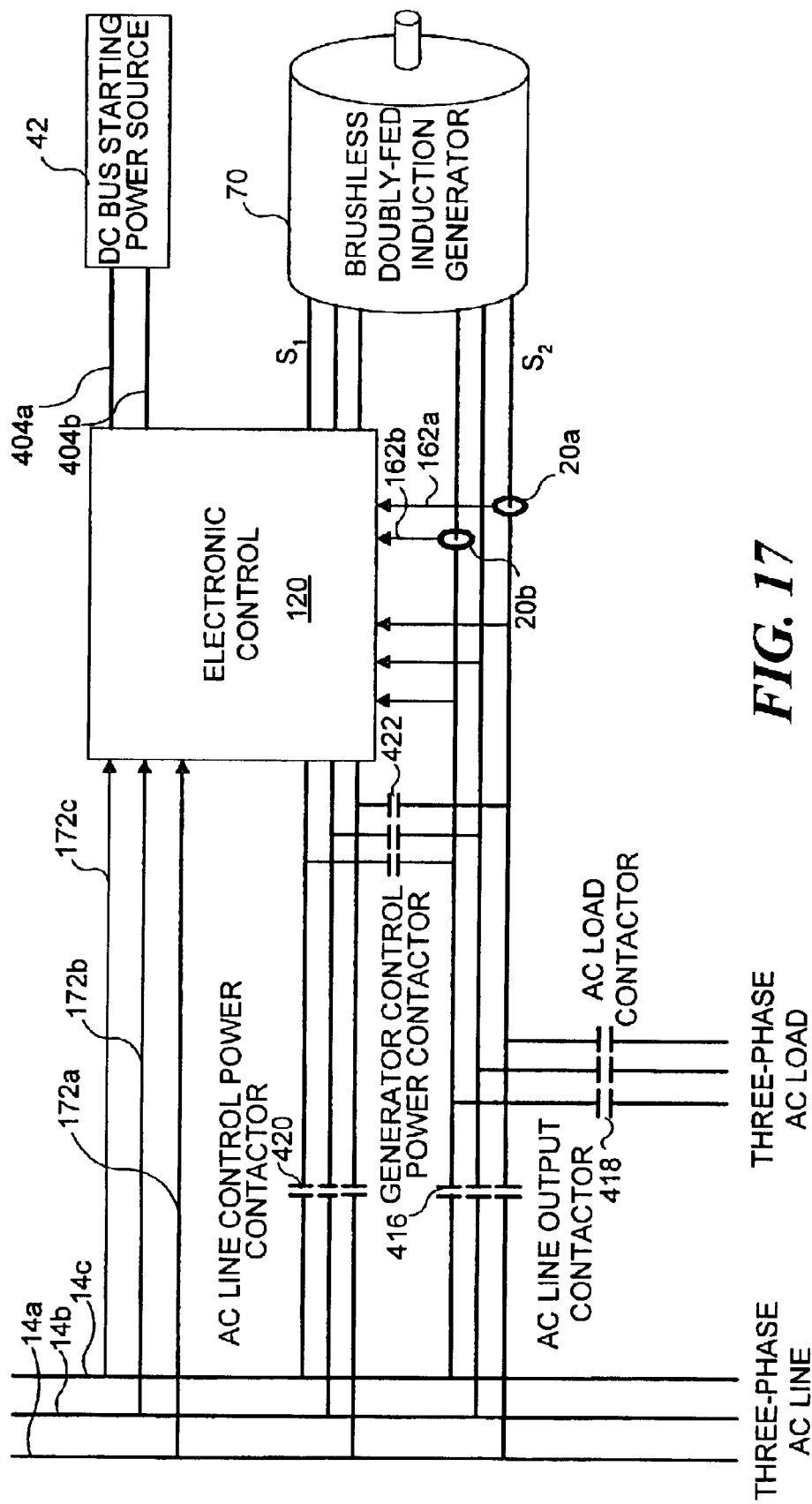
Figure 18:
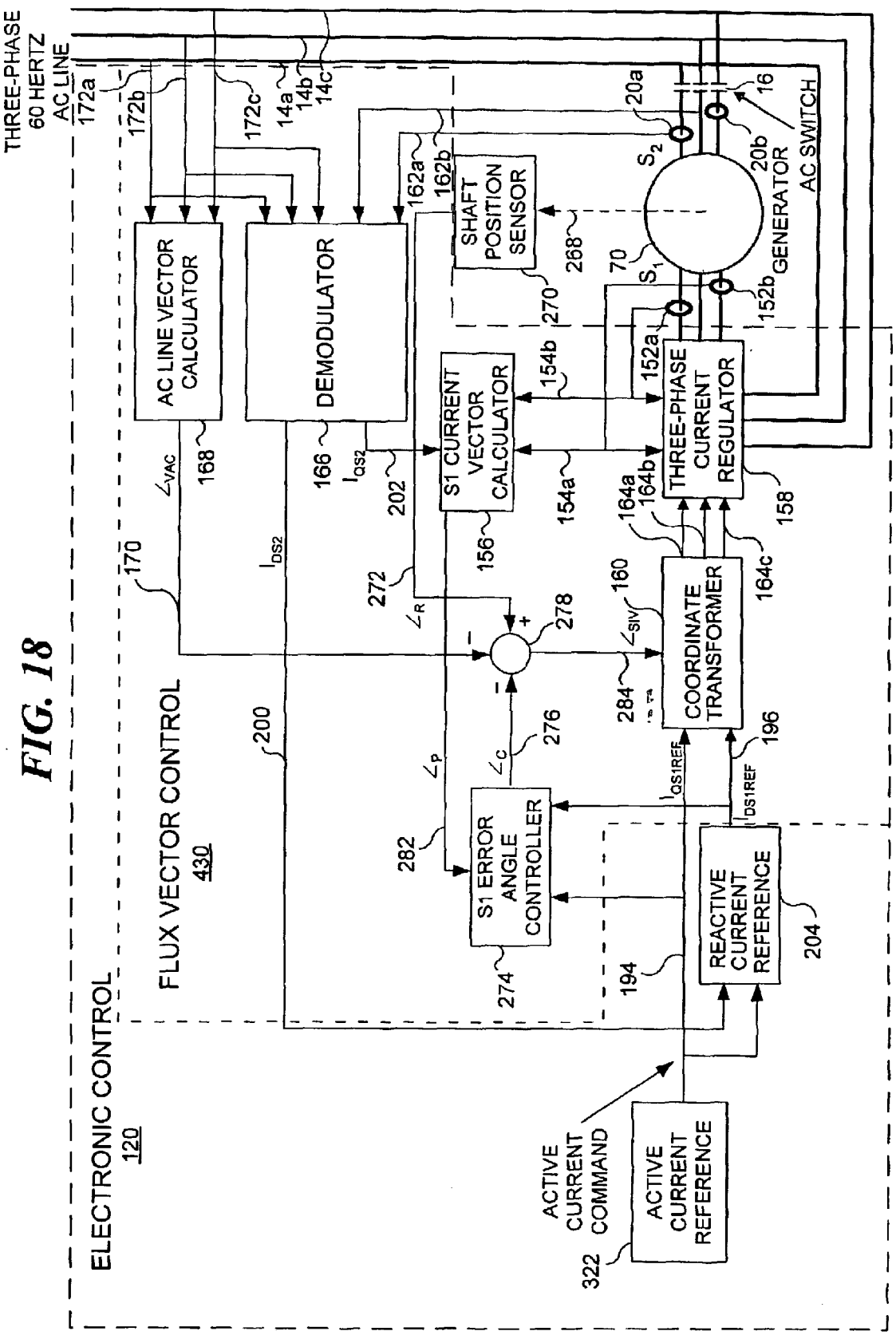

FIG. 14 is a block diagram of an alternate embodiment of the motor and control using a voltage source inverter, with the second stator shorted;

FIG. 15 is a block diagram of a preferred embodiment of the control and a generator for doubly-fed flux vector controlled generation, with the second stator connected to the AC power line to deliver power;

FIG. 16 is a block diagram of a preferred embodiment of the control and doubly-fed generator for standalone generation, with the second stator connected to a load;

FIG. 17 is a block diagram of a preferred embodiment of the control and doubly-fed generator, configured for remote switching between co-generation and standalone generation; and FIG. 18 is a block diagram of an alternate embodiment of the control and generator for doubly-fed flux vector controlled generation, with the second stator connected to the AC power line to deliver power to the line.

DESCRIPTION OF THE PREFERRED EMBODIMENT

The principles of flux vector control applied to brushless doubly-fed reverse-phase-rotor induction machines are most simply illustrated by considering a dual cage-rotor brushless doubly-fed motor as described in above-noted U.S. Pat. No. 6,278,211. As described therein, the motor includes two identical three-phase four-pole stators with an equal number of winding turns on each, and two cage-rotors, which are reverse-phase-connected. One stator, S2, is connected to a 60 Hz three-phase AC power line through a switch and the other stator, S1, is controlled with a three-phase current regulator. This brushless motor has a synchronous speed of 900 RPM, when the S1 frequency ($f_{S1}$) is zero and the S2 frequency ($f_{S2}$) is 60 Hz, and has a continuously controllable speed range from zero to slightly less than 1800 RPM, the speed at which the rotor cage current frequency is substantially zero.

A preferred embodiment of an electronic control 120, which is suitable for all embodiments of the present invention described herein, is shown in FIG. 7. This control includes a circuit board (not separately shown) on which are mounted a plurality of electronic components, including a microcontroller 121. It is contemplated that a single chip digital signal processor (DSP)-based motor controller, such as a Model ADMC401, which is available from Analog Devices, Inc., or other similar devices can be employed for microcontroller 121. Depending upon the microcontroller actually used, it may include one or both of internal read only memory (ROM) and random access memory (RAM) (neither shown), a high speed 8 channel analog to digital (A/D) converter 122, digital input and output (I/O) interfaces 123, a PWM generator 124, serial ports 125, an external memory interface address and data bus 126, an encoder interface 127, and event timer inputs 128. An external electrically erasable program memory (EEPROM) 135 is preferably used for storing machine instructions that define the functions implemented by electronic control 120, as discussed above. Coupled to the microcontroller bus in the embodiment shown is an EEPROM memory 135. Although not shown, external conventional random access memory (RAM) and read only memory (ROM) may also be connected to the bus to increase the memory capacity of the control. A timing quartz crystal 142 used with the internal oscillator provides a time base signal for the microcontroller.

Also connected to the microcontroller are interface devices for the A/D inputs, which condition the feedback signals and substantially eliminate any high frequency components of the signals applied to the corresponding analog-to-digital converter inputs on the microcontroller. Two of these A/D inputs are employed for stator S2 current monitoring of transducers 20a and 20b and are connected to filters 138a and 138b, respectively, by conductors 162a and 162b. Each filter contains a burden resistor (not separately shown) for the current transducer and a low pass filter to reduce the noise transmitted to A/D converter 122, with a typical single order time constant of 5 to 50 microseconds. Two of these A/D inputs are employed for stator S1 current monitoring of Hall effect transducers 152a and 152b (shown in other Figures) and are connected to filters 139a and 139b by conductors 154a and 154b respectively. Filters 139a and 139b include burden resistors (not separately shown) and have typical filter time constants of 5 to 50 microseconds.

Two of the A/D inputs are employed for stator S2 voltage monitoring (as indicated in a block 129). Inputs to an isolation transformer 130a are connected to stator S2 by conductors 18a and 18b. The outputs of the isolation transformer are connected to filter 132a and a common conductor. Filter 132a typically has a 5 to 50 microsecond time constant and is coupled to one input of A/D converter 122. Inputs to an isolation transformer 130b are connected to stator S2 by conductors 18b and 18c, and the outputs of the isolation transformer are supplied to the input of a filter 132b and to the common conductor. The output of filter 132b is supplied to an input of the A/D converter.

An isolation transformer 130c has its inputs coupled to AC line connections 172a and 172b to monitor three phase 60 Hz AC voltage, as shown in a box 131, and its outputs are supplied to a filter 132c and to the common. The output of filter 132c is supplied to an input of the A/D converter. An isolation transformer 130d has its inputs similarly coupled to AC line connections 172b and 172c and its outputs connected to a filter 132d and to the common. The output of filter 132d is connected to an input of the A/D converter and to a zero crossing detector 133. The zero crossing detector output is applied to the input of an event timer 128 to enable synchronizing the controller with the AC power line.

An electronic power converter 143 is coupled to a PWM generator 124 in microcontroller 121. This electronic power converter converts the three-phase PWM commands from PWM generator 124 into S1 voltages, using power supplied either from or to the three-phase power line. The electronic power converter, which includes an input converter connected to the AC line, a capacitor bank, and a PWM output converter connected to S1 (none shown), is very similar to that contained within many commercially available motor controls such as the Series 15, 18, and 22 motor controls from Baldor Electric Company. The Series 15 and 18 motor controls have rectifier AC power input converters and cannot return energy from stator S1 to the AC power line. The Series 22 motor control is a regenerative motor control with an insulated gate bipolar transistor (IGBT) bridge converter connected to the AC power line through inductors. This model can bi-directionally control power between a motor and the AC power line.

An external encoder 134 (optional), if used, is connected to microcontroller encoder interface 127. All digital inputs and outputs 140 to and from microcontroller digital I/O 123 are preferably optically isolated by optical isolators 141; alternatively, the inputs and outputs can be relay isolated. Thus, external AC switch 16 and a shorting switch 62, which are typically contactors, are connected to optical isolators 141, for control by the microcontroller. As used herein and in the claims that follow, the term "switch" is intended to encompass any type of mechanical, electromechanical, solid-state device that is used to selectively couple and open a connection between conductors.

Serial ports 125 on the microprocessor, which are coupled to external serial input/output devices 136, are provided to accept serial sensor inputs to the microcontroller, and to supply serial signals required by such external serial input/output devices in the system.

Electronic controls 120 employing an Analog Devices, Model ADMC401 or an equivalent for microcontroller 121 are particularly well suited for control of the embodiments of the present invention described herein, because this microcontroller includes fast A/D conversion capability and a digital signal processor (DSP) core for carrying out the required trigonometric calculations employed in the control method. The Model ADMC401 can sample and carry out A/D conversion of all 8 channels in 2 microseconds, effectively eliminating skew from the data. Synchronizing this controller with the AC line enables sampling of the A/D inputs at selected points in the AC line cycle, which facilitates simplification of many of the trigonometric functions by storing pre-calculated constants for many of the required calculations. Different calculation intervals can be employed, depending on the allowable delay in each portion of the control. The PWM generator and inner current loop would typically be updated once or twice per PWM cycle, or about 50 to 100 times per line cycle for a typical PWM frequency of 3 kHz. For moderate performance machines, the transformations not within a current loop can typically be updated at twice the AC line frequency, using extrapolation to provide smooth data to the faster portions of the system. Speed loop calculations for drives and voltage and frequency loop calculations for generators can typically also be made at this lower rate without adversely affecting performance in most applications.

FIG. 8 is a block diagram of brushless doubly-fed induction motor 60 and a preferred embodiment of a flux vector control 120, which is suitable for use in controlling the motor in accord with the present invention. The control method used is based on determining the position of the voltage vector on S1 caused by the AC line and rotor rotation from sensed electrical variables of the two stators without requiring a position feedback sensor. Stator S1 currents are then controlled to substantially independently regulate motor excitation distribution between the stators and control torque. The functional elements of the control technique are shown in block diagram form, even though many of the functions are typically sequentially performed by the microprocessor controller.

An AC line connected doubly-fed flux vector motor control 200 includes a three-phase current regulator 158, a coordinate transformer 160, a S1 current vector calculator 156, and a demodulator 166. Brushless doubly-fed motor 60 is as described above, with stator S1 connected to the output of three-phase current regulator 158 through current transducers 152a and 152b, and stator S2 connected to three-phase AC switch 16 through current transducers 20a and 20b.

Three-phase 60 Hz AC power line 14 is connected to the power input of three-phase current regulator 158, to AC switch 16, and to both a demodulator 166 and an AC line vector calculator 168 through voltage taps 172. The three-phase line voltage feedback provided by voltage taps 172 to the demodulator and AC line vector calculator is typically reduced to a desired level through a step-down winding ratio of isolation transformers 130c and 130d (shown in FIG. 7); the third line-to-line phase voltage is calculated from the other two line-to-line phase voltages. A phase locked loop (not shown) is preferably used to reduce the effects of AC line noise on the line voltage input. Timing pulses at twice the line frequency may be provided through event timer input 128 (shown in FIG. 7) to synchronize the timing of demodulator 166 and microprocessor control 120 with the AC line, and as a further noise reduction measure.

Three-phase AC switch 16, which is connected between AC power line 14 and S2, can be a contactor or an AC static switch employing silicon controlled rectifiers (SCRs), IGBTs, or other suitable electronic switching devices. The AC switch is closed for doubly-fed flux-vector control. Three-phase current feedback is preferably sensed from S2 using two Hall-effect current sensors 20a and 20b and supplied to the demodulator 166 through conductors 162. The third three-phase current is calculated from the other two phase currents. Similarly, three-phase current feedback 152 from stator S1 is preferably monitored with two Hall-effect current sensors 152a and 152b, and their output signals are supplied to three-phase current regulator 158 and to S1 current vector calculator 156 through conductors 154a and 154b.

Demodulator 166 demodulates the 52 current input on conductors 162a and 162b relative to the AC line voltage input on voltage taps 172a, 172b, and 172c into it's active $1_{QS2}$ Output (zero phase angle relative to the AC line voltage vector), conveyed on a conductor 202 and a reactive $I_{DS2}$ (90 degrees phase relative to the AC line voltage vector) output, which is conveyed on a conductor 198. These quadrature components are in stationary coordinates, resulting in DC signals under ideal constant speed and torque conditions, when the angle between the AC line voltage and S2 current vectors is fixed. Reactive current $I_{DS2}$ is stator S2 excitation current, and active current $I_{QS2}$ is stator S2 torque-producing current. S1 current vector calculator 156 calculates the vector magnitude/$I_{S1}$/and angle/$_{IS1}$ of the current inputs on conductors 154a and 154b and then calculates $I_{QS1}=I_{QS2}$ (S1/S2 Current Transformation Ratio) using the input $I_{QS2}$, which is conveyed on a conductor 202. The current vector calculator employs the predetermined current transformation ratio from S2 to S1 to calculate the vector angle of the active (torque producing) component of current vector $I_{S1}$, where $/_{QS1}=/_{IS1}\pm\cos^{-}I_{QS1}/I_{S1}$, and supplies this angle $/_{IQS1}$ as an output on a conductor 174.

A coordinate transformer 160 has inputs coupled to conductors 194 and 196 to receive the S1 current command components $I_{QS1ref}$ and $I_{DS1ref}$, respectively, in stationary coordinates and the input coupled to conductor 174, which conveys S1 vector angle $\angle_{IQS1}$. Outputs of the coordinate transformer convey the S1 current commands on conductors 164a, 164b, and 164c in three-phase rotating coordinates. The coordinate transformer implements the coordinate transformation, sin-cos and ⅔ phase conversion functions taught by the above-noted Leonhard reference and operates as discussed in the text of that reference. The outputs of the coordinate transformer cause the S1 current commands conveyed to three-phase current regulator 158 to rotate about the S1 stator in synchronism with the voltage induced on the stator S1 windings by the AC power line voltage on the stator S2 windings.

The current command rotation indicated by angle $\angle_{IQS1}$ causes the S1 currents from three-phase current regulator 158 and the resultant S1 flux vector to also rotate about the S1 stator in synchronism. Three-phase current regulator 158 converts the three-phase current commands from coordinate transformer 160 into S1 currents, using power supplied from or to three-phase AC power line 14 and current feedback from Hall effect sensors 152a and 152b conveyed on conductors 154a and 154b. Three-phase current regulator 158 includes electronic power converter 143 and PWM generator 124 of FIG. 7, but implements current regulating and other control functions based upon the programming of microcontroller 121 and in response to other portions of control 120.

In operation, the current $I_{DS1ref}$ and $I_{QS1ref}$ reference inputs 194 and 196 are coordinate transformed from stationary coordinates into rotating coordinate outputs 164a, 164b, and 164c by coordinate transformer 160 in response to the $\angle_{IQS1}$ input, which results in current regulator 158 causing the three-phase current in stator S1 and hence, the vector of flux in stator S1, to rotate with $\angle_{IQS1}$ in synchronism with the voltage vector induced on the stator S1 windings by the AC power line voltage on the stator S2 windings.

Since current loops around three-phase current regulator 158 have typical bandwidths of 1000 to 5000 radians per second, electronic control 120 provides rapid response to current reference inputs 194 and 196. Any change in the active current reference input 194 quickly results in corresponding amplitude changes and advancement or retardation of the current vector applied to S1 and hence corresponding changes in the shaft torque. Changes in the reactive current command also cause rapid S1 current vector changes, which merely transfers excitation current from one stator to the other as total machine excitation current is determined by motor parameters and the AC power line voltage. The method employed by the present invention for computing the S1 vector angle $\angle_{IQS1}$ 174, relies on an inherent characteristic of the synchronously controlled doubly fed induction machine. Specifically, the torque producing component $I_{QS1}$ of current in stator S1 is substantially equal to the torque producing component $I_{QS2}$ of current in stator S2 times the S1/S2 current transformation ratio, enabling the value of $I_{QS1}$ to be calculated from the demodulated value of $I_{QS2}$. Measured S1 and S2 currents are thus used as described above to calculate $\angle_{IQS1}$, which is the position of the AC voltage vector on S1 caused by the AC line connected to S2. This method avoids the need to measure position or flux directly.

As shown in FIG. 8, the reactive current reference 204 has inputs 194 for active current command $I_{QS1REF}$, and 198 for $I_{DS2}$, enabling the reference to be programmed in several ways, depending on the selected strategy for distributing excitation currents between the two stators. The simplest strategy is to set S1 excitation reference input 196 equal to S2 excitation reference input 198, with low pass filtering to prevent rapid changes in reference input 196. This strategy causes excitation currents to be equally distributed between the two stators and eliminates excitation current from the rotor conductors. Alternately, a constant power factor S2 current control strategy can be used by setting the excitation reference input 196 to cause input 198 to be a fixed ratio of active current command input 194, with low pass filtering to prevent rapid changes in reference input 196. A 1.0 power factor S2 current control strategy can be used by setting excitation reference input 196 to cause input 198 to be zero. Any S2 power factor desired at any load may be commanded, provided that the current in both stators is adequately high to enable measurement and proper operation of the vector calculators. The power factor may be automatically or manually varied with operating conditions with no loss of control provided the minimum current limitation discussed above and the three-phase current regulator and motor capabilities are not exceeded. When one stator winding furnishes all or part of the excitation for the other, the current in the stator windings is no longer equal and one winding may reach its capacity before the other is fully loaded.

FIG. 8 illustrates a speed loop that includes a speed reference 184, and a speed calculator 180 operating from a shaft angle $\angle_R$ input 178. A comparator 182 is employed to subtract a speed feedback signal 188, from a reference signal 186, providing an error signal 190. The error signal is conveyed to speed controller 192. AC line vector calculator 168 calculates vector angle $\angle_{VAC}$ output 170 from the AC line inputs provided by voltage taps 172a, 172b, and 172c, as described above. A comparator 176 has vector angle inputs $\angle_{VAC}$ 170 and $\angle_{IQS1}$ 174, respectively, and calculates the shaft angle $\angle_R$ in electrical phase units as their vector sum. A shaft angle output 178 is supplied to speed calculator 180, which calculates speed output 188, from the difference between successive $\angle_R$ shaft position inputs. The speed controller, typically a proportional plus integral type controller, develops torque reference input 194, which is supplied to the active current controller in response to input 190. Typical bandwidths of this speed loop range may range from a few radians per second up to 200 radians per second or more.

Reversing the phases of both the control power to S1 and the AC line connection to S2 reverses the direction of rotation. This phase reversal must be accomplished prior to connecting the AC line to S2. The preferred method is to electronically reverse the phase of the S1 control in the outputs of three-phase current regulator 158 and replace AC switch 16 with a reversing contactor to enable user selection of the direction of S2 phase rotation.

To smoothly connect the AC line to stator S2, the three-phase current vector applied to stator S1 must cause stator S2 to generate voltage equal to the AC line voltage, amplitude, and phase before the AC switch of FIG. 8 is closed. FIG. 9 is a preferred embodiment of the functional control scheme employed to accomplish this smooth connection of the AC line to the brushless doubly-fed motor. The major functional elements of the control scheme are shown in block diagram form even though many of these functions are typically sequentially performed by the microprocessor controller. AC power line 14, AC switch 16, motor 60, three-phase current regulator 158 and its inputs 164a, 164b, and 164c from coordinate transformer 160 and the outputs 154a and 154b from Hall effect current sensors 152a and 152b, AC line vector calculator 168 and voltage taps 172a, 172b, and 172c from AC power line 14 are as described above for FIG. 8. AC line vector calculator 168 determines a magnitude output 216 and an angle output 170, which couple to magnitude and angle comparators 218 and 222, respectively. An S2 voltage vector calculator 210 is connected to the three-phase output of S2, which is typically sensed by two step-down isolation transformers 130a and 130b connected to the S2 voltage vector calculator by voltage taps 18a, 18b, and 18c, as shown in FIG. 7. S2 voltage vector calculator 210 calculates a vector magnitude output 212 and an angle output 214 and supplies these to magnitude and angle comparator 218 and 222, respectively. An output 220 of magnitude comparator 218 is connected to the input of a proportional plus integral type reactive current controller 234, the output of which is connected to input 196 of coordinate transformer 160. The output of reactive current controller 234 connected to input 196 is preset to the normal full machine excitation at the beginning of the synchronization process and enabled as a proportional plus integral control later in the process.

Angle comparator 222 produces an output 224, which is connected to the input of a frequency and phase controller 226. Frequency and phase controller 226 provides a frequency command 228 to an integrator 230 in response to an angle error input 224. At the beginning of the synchronization process, an output frequency command 228 is preset, as will be described below. Subsequently, this controller is switched to a proportional plus integral type control mode, with the initial output condition set to the most recent frequency command output.

An integrator 230 integrates the applied frequency command from the frequency and phase controller to produce a $\angle_{S1V}$ output 232, which is coupled to coordinate transformer 160. Coordinate transformer 160 operates as described above, except that it operates with only excitation reference $I_{DS1ref}$ input 196 during synchronization, and angle input 232.

To start doubly-fed flux vector control at or near zero speed, a brake may be applied to prevent shaft rotation, but is not required. Normal full machine excitation command is applied by preset reactive current controller $I_{DS1ref}$ input 196. Frequency and phase controller 226 preset frequency output 228 is set to approximately the frequency of AC power line 14, in the reverse rotation direction. These commands cause coordinate transformer 160 to output a current vector command 164 at the preset frequency and amplitude. Three-phase current regulator 158 converts this command into a current vector in S1 rotating at $\angle_{S1V}$, i.e., output 232. This applied excitation will cause a three-phase S2 voltage rotating in the same direction as and at a frequency close to the frequency of AC power line 14. Angle comparator 222 outputs vector angle 224 for the difference between the AC line and the S2 output. The frequency of this vector angle rotation is calculated by frequency and phase controller 226, which adds this frequency to the initial frequency and supplies the sum as output frequency command 228, for use during synchronization with the AC power line. Reactive current controller 234 is then enabled as a proportional plus integral type controller with an initial output condition equal to the preset value, which will cause the closed voltage loop to drive the S2 output voltage to the AC power line voltage. The three-phase S2 voltage on voltage taps 18a, 18b, and 18c will shift to a frequency very close to that of AC power line 14 due to the excitation at the synchronization frequency calculated above. Frequency and phase controller 226, which operates as a proportional plus integral type controller, is now enabled to operate from phase error input 224. The resulting closed loop phase controller will drive the S2 output into frequency and phase synchronism with AC power line 14. When voltage error 220 and phase error 224 are sufficiently small, AC switch 16 is automatically closed to initiate doubly-fed flux vector control. The block diagram of FIG. 9 is then switched to that of FIG. 8, with the initial condition that active current command output 194 is set to zero, and the initial condition of reactive current reference output, which provides input 196, is set to the value of $I_{DS1ref}$ in FIG. 9. This starting method insures that doubly-fed flux vector control is only initiated by closing AC switch 16 after the flux in motor 60 has been synchronized to oppose the voltage of AC power line 14 that will be applied. This approach prevents uncontrolled currents from occurring and insures minimum electrical and torque transients in the system. In any circumstance, during doubly-fed flux vector operation when currents exceed desired limits, AC switch 16 is opened and a flying restart can be made.

FIG. 3 shows plot 76 of stator S1 power, plot 78 of stator S2 power, plot 80 of stator S1 frequency, and plot 82 of stator S1 voltage—all versus speed, for a typical dual 4-pole brushless doubly-fed motor connected to a 60 Hz AC power system. Both stator windings are identical and the three-phase current regulator is rated at about 50% of the motor rating at maximum speed. The AC line supplies power (plot 78) proportional to output torque to stator S2 at all speeds; neglecting losses, this power ranges from zero at no load to 50% of the rated motor output power at rated torque. Again neglecting losses, the three-phase current regulator absorbs power (plot 76) proportional to the product of torque and the difference between 900 RPM and the operating speed from stator S1 at speeds below 900 RPM. This power absorption ranges from 50% of motor rating at rated torque and zero speed to zero at 900 RPM. The three-phase current regulator supplies power (plot 76) proportional to the difference between 900 RPM and the operating speed to S1 at speeds above 900 RPM. This power ranges from zero at 900 RPM to almost 50% of motor rating at 1750 RPM and rated load.

In one variation of this preferred embodiment, S2 voltage taps 18a, 18b, and 18c of FIG. 9 are replaced with taps across AC switch 16. The vector outputs of a voltage vector calculator connected to these taps and operating as previously described would have desired difference voltage vector magnitude and angle outputs 220 and 224, respectively, thus eliminating the need for AC line vector calculator 168 and comparators 218 and 222 in FIG. 9. Since the AC line vector calculator is required for other modes of control, this variation does not result in a substantial simplification of the overall control.

Description of Alternate Embodiment for Flux Vector Control of Brushless Doubly-Fed Induction Motor An alternate vector control embodiment 260, shown in FIG. 10, controls S2 currents from the stationary coordinate active 194 and reactive 244 current commands rather than controlling S1 currents as described for the preferred vector control embodiment 200 of FIG. 8. Calculation of $\angle_{IQS1}$ is performed in the manner described for FIG. 8. AC power line 14, AC switch 16, motor 60, current sensors 20 and 152, S1 current vector calculator 156, demodulator 166, coordinate transformer 160 and three-phase current regulator/inverter 158', which is used as a three-phase current regulator, with associated interconnections are as described above for control embodiment 200 of FIG. 8, except that inputs 194 and 196 to coordinate transformer 160 are replaced as described below. Active and reactive current controllers 262 and 250, respectively, which are typically integral controls, convert their input current error signals 256 and 248, respectively, into S1 current commands 258 and 252 in stationary coordinates, which are supplied to coordinate transformer 160. Feedback of active $I_{QS2}$ output 202 and reactive $I_{DS2}$ output 198 from demodulator 166 is subtracted from reference inputs 194 and 244, respectively, by comparators 254 and 246 to develop error signals 256 and 248.

Alternate control embodiment 260 adds closed loop S2 stationary coordinates current controllers 250 and 262, with feedback 198 and 202 to embodiment 200, in cascade with coordinate transformer 160 and three-phase current regulator/inverter 158'. These active and reactive S2 current loops include the coordinate transformation within the loops, which will limit their bandwidth, but provides the advantage that the current in the AC line is directly controlled. The disadvantage of this approach is that the coordinate transformation must be fast, about 5 to 10 times the outer current loop bandwidth, to avoid excessive delay and reduced stability in the current loops.

In this alternate control embodiment, the S2 reactive current is directly controlled by output 244 of reactive current reference 204. Thus, constant S2 power factor is obtained by setting output 244 to a ratio of active current command 194. A 1.0 power factor is obtained by setting 244 to zero. Flexibility of reactive current control with this alternate is equal to that of the original embodiment. Speed loop elements and operation are as described herein, for the embodiment of FIG. 8.

In a variation of embodiment 260, current regulator/inverter 158' is operated as an inverter, the current feedback from sensors 152 through connections 152 to three-phase current regulator/inverter 158' is not required, and active and reactive current controllers 262 and 250, respectively, are modified to be proportional plus integral controls so that that they form the only current loops. A similar approach is commonly employed in industrial flux vector controls for standard induction motors. The coordinate transformation limits current loop bandwidth, because the inner current loops without the transformation have been deleted. Attaining current loop bandwidths of 1000 to 5000 radians per second requires coordinate transformations at about 2000 to 10,000 times per second, which increases the speed required of the microprocessor control.

Description of Second Alternate Embodiment for Flux Vector Control of Brushless Doubly-Fed Induction Motor A higher performance alternate embodiment, shown in the block diagram of FIG. 11, uses the shaft position sensor method of flux vector control 280, with an offset correction based on sensed stator currents. A shaft position sensor 270 provides accurate incremental shaft position and an offset correction 276 aligns the incremental shaft position with the flux vector in S1. AC power line 14, AC switch 16, current sensors 20 and 152, S1 current vector calculator 156, AC line vector calculator 168, demodulator 166, coordinate transformer 160, and three-phase current regulator 158 are as described for FIG. 8. Shaft position sensor 270, typically an encoder or a proximity sensor that senses gear teeth of a gear attached to the shaft, is connected to the motor shaft with a coupling 268 and provides a $\angle_R$ output 272 to a comparator 278 and speed calculator 180. The S1 current vector calculator calculates $\angle_P = \cos^{-1} I_{QS1}/I_{S1}$ and supplies this angle as an output 282. An S1 error angle controller 274 has inputs 194 and 196 of $I_{QS1REF}$ and $I_{DS1REF}$, respectively, from which it calculates the angle between the vector $I_{S1REF}$ and its active component $I_{QS1REF}$ and subtracts this angle from $\angle_P$ between $I_{S1}$ and $I_{QS1}$ from an input 282. The result is integrated to develop a $\angle_C$ output 276 applied to comparator 278. The integrator gain in S1 error angle controller 274 is typically set for an error correction loop bandwidth of 4 to 20 radians/second and will drive any starting position offset to near zero in less than a second. Input 272 less inputs 170 and 276 from comparator 278 is $\angle_{S1V}$, which comprises an input 284 to coordinate transformer 160. Reactive current reference 204 and the speed loop are as described herein for the embodiment shown in FIG. 8.

This method can provide better dynamic performance than that of the first preferred embodiment, but requires the addition of the shaft position sensor. It is superior when rapid dynamic performance, such as rapidly varying high accelerations and accurate speed control are required. The error angle correction method effectively solves the angle offset problems, which occur in position feedback based systems due to initial misalignment or round-off errors in the control.

Description of Third Alternate Embodiment for Flux Vector Control of Brushless Doubly-Fed Induction Motor A third alternate embodiment, shown in FIG. 12, uses a different method implemented by a flux vector control 300 to determine the $\angle_{S1V}$ input to coordinate transformer 160. The $\angle_R$ shaft rotation is calculated by summing the angles of current vectors $\angle_{IS1}$ and $\angle_{IS2}$, with the excitation current in the two stators made equal so that the rotation of these angles is equal to the rotation of the shaft. Correction of any initial offset errors or round-off errors is provided by the S1-S2 angle calculator output.

AC power line 14, AC switch 16, current sensors 20a, 20b, and 152a and 152b, S1 current vector calculator 156, AC line vector calculator 168, coordinate transformer 160, and three-phase current regulator 158 are as described herein for the embodiment of FIG. 8. Inputs 162a and 162b to an S2 current vector calculator 290 are converted to S1 current vector parameters/$I_{S2}$/and $\angle_{IS2}$, which are supplied on an output 292 for input to a demodulator 298 and a comparator 296. An S1-S2 angle controller 288 calculates the angle between the vector $I_{DS1REF}$ and its active component $I_{QS1REF}$ conveyed on inputs 194 and 196, calculates the angle between the vector $I_{DS2}$ and its active component $I_{QS2}$ conveyed on inputs 198 and 202, computes the difference between these angles, and integrates the result to determine the value $\angle_C$, which is supplied on an output 276 to a comparator 278. The gain of the integrator of is typically set for an error correction loop crossover frequency of about 4 to 20 radians per second. S1-S2 angle controller 288 will thus reduce any offset between the actual AC line induced flux vector angle on S1 and the computed angle to near zero in less than a second. Comparator 278 subtracts inputs 170 and 276 from input 178 and supplies a $\angle_{S1V}$ result 284 (which is the computed equivalent of the AC line voltage vector on S1) to coordinate transformer 160. Demodulator 298 demodulates the $I_{S2}$ current vector relative to the AC line vector, calculating the active current $I_{QS2}$ and reactive current $I_{DS2}$ and supplying these values on outputs 202 and 198, respectively, to S1-S2 angle controller 288; output 198 is also connected to reactive current reference 204.

This third alternate operates the same as the preferred embodiment of FIG. 8, except for the method of calculating the angle input to coordinate transformer 160. The basic method used for this third alternate embodiment relies on the excitation current in both stators being equal, so that the rotation of $\angle_R$ as shaft angle output 178 accurately reflects the shaft rotation. This requirement limits the distribution of excitation current between the stators, although an additional correction for unequal stator excitation may be added to allow the excitation to be varied, as discussed for the preferred embodiment of FIG. 8. This third alternate embodiment is further limited by the need to compute $\angle I_{S2}$ accurately, which is difficult when this current is relatively low, such as at low load with most of the excitation supplied by S1.

Description of Preferred Embodiment for Dual-Mode Control of Brushless Doubly-Fed Induction Motor The preferred embodiment dual-mode control of FIG. 2B operates the brushless doubly-fed induction motor as a flux vector controlled singly-fed induction motor below synchronous speed with stator S2 shorted and smoothly switches to flux vector controlled doubly-fed operation above synchronous speed. Nearly full rated torque is available at sub-synchronous speeds, and full rated torque is available above synchronous speed.

Stator winding S2 acts like the rotor of a conventional induction motor when it is shorted. When a slip frequency exists, the rotor winding or cage within the second stator furnishes the excitation current and induces current in S2. The same rotor current also flows in the rotor winding or cage within stator S1 and also develops torque in this rotor winding or cage. Thus, both of the winding sets aid in providing output torque, enabling the motor to provide nearly the torque capacity it has when used in the doubly-fed flux vector mode of operation. Stator S1 supplies the excitation current for both itself and stator S2 through the rotor windings or cages, thereby loading S1 and the rotor more than S2. When stator S2 is shorted, the current flowing through the shorted connection is a direct measure of the slip and torque of the motor, since the vector magnitude of this current is closely proportional to torque, and the vector angle of this current rotates at the slip frequency. The torque direction is opposite to that for the rotation of the S2 current vector. Rotor position in electrical phase units can be calculated from S1 and S2 current vector rotations by $\angle_R = \angle_{S1} + \angle_{S2}$, with all of the variables defined as previously described.

FIG. 13 is a block diagram of the brushless doubly-fed motor and a preferred embodiment of the control for the motor with stator S2 shorted. AC power line 14, AC switch 16, current sensors 20a and 20b and 152a and 152b, S1 current vector calculator 156, coordinate transformer 160, and three-phase current regulator 158 are as described herein for the embodiment of FIG. 8. A three-phase shorting switch 62 is connected to S2 leads 56a, 56b, and 56c between current sensors 20a and 20b, and AC switch 16. Switch 62, which may be a contactor or an AC static switch employing SCRs, IGBTs, or other suitable electronic switching devices, is closed for operation in this mode. Inputs 162a and 162b to S2 current vector calculator 290 are converted to S1 current vector parameters/$I_{S2}$/and $\angle_{IS2}$, which are conveyed on output 292 to inputs of S1 current vector calculator 156 and a comparator 304. Comparator 304 sums the 292 input $\angle_{IS2}$ (which is the torque producing current angle, since there is no excitation current in $I_{S2}$) with the 174 input $\angle_{IQS1}$ to obtain $\angle_R$ as shaft angle output 178. A slip angle calculator 312 calculates the slip frequency by a multiplying torque command on input 194 by a preset slip frequency/ $I_{QS1ref}$ constant and integrates the result to develop a slip angle output 302, which is added to $\angle_R$ shaft angle output 178 by a comparator 306 to obtain $\angle_{SIV}$ result 284 that is applied to coordinate transformer 160.

Three-phase current regulator 158 has an additional % MOD output 308, which was not previously described, corresponding to the percent modulation output of the PWM control included in the current regulator. This output is coupled to a reactive current limiter 310, which supplies IDSlref for input 196 to the coordinate transformer 160. The current limiter 310 sets the value on input 196 to the normal maximum excitation of the motor for speeds not requiring field weakening and reduces the excitation in response to % MOD output 308 exceeding a preset % MOD limit, to provide field weakening. Speed loop reference 184, speed calculator 180, and speed controller 192, and their interconnections are as previously described herein for the embodiment of FIG. 8, with the output of the controller $I_{QS1ref}$ conveyed on input 194 to coordinate transformer 160 and slip angle calculator 312.

In operation, this system is a flux vector induction motor control that regulates torque in response to the $I_{QS1}$ torque on input 194, which is supplied from speed controller 192. Full excitation is set with the $I_{DS1ref}$ limit that operates at all lower speeds where the modulation is less than about 100%. In the event that the motor is operated in this mode above the speed available at a fixed volts per Hz, where three-phase current regulator voltage output saturation would occur, modulation feedback % MOD will exceed the preset modulation limit in reactive current limiter 310, which will lower the excitation at these higher speeds to maintain near-maximum voltage output. This excitation control loop functions as a constant voltage control above the speed of the motor that corresponds to that resulting from application of full available S1 voltage by three-phase current regulator 158 when $I_{DS1ref}$ is at full excitation value.

When switching from singly-fed operation with S2 shorted, to doubly-fed flux vector control at or near the synchronous speed, the block diagram of FIG. 9 is used as described above, modified by using information available prior to initiating the synchronization process. The starting excitation frequency is calculated from the measured line frequency and the motor speed and set as the synchronization frequency output of frequency and phase controller 226 (FIG. 9) as soon as three-phase shorting switch 62 is opened. Normal full machine excitation is applied by the output of preset reactive current controller 234 conveyed on input 196. These commands cause the coordinate transformer to output a current vector command at the preset frequency and amplitude. Three-phase current regulator 158 converts this command into the commanded current vector in S1, which causes a three-phase S2 voltage rotating in the same direction as and at a frequency and amplitude close to that of the AC line. Reactive current controller 234 and frequency and phase controller 226 are then enabled to operate as proportional plus integral controllers, with initial output conditions determined by the preset values, which will cause the closed voltage loop to drive the S2 output voltage to the AC line voltage and the closed phase loop controller to drive the S2 output into frequency and phase synchronism with the AC line, enabling AC switch 16 to be closed to initiate doubly-fed flux vector control. Control according to the block diagram of FIG. 9 is then switched to control according to the embodiment of FIG. 8, with the initial condition of reactive current controller 204 set to the $I_{DS1ref}$ on input 196. This switching method insures that doubly-fed flux vector control is only initiated by closing AC switch 16 after the flux in the motor has been synchronized to oppose AC line voltage 14, thereby preventing the occurrence of uncontrolled currents and insuring minimum electrical and torque transients in the system. In any application or circumstance where currents exceed desired limits, the AC switch can be opened and a flying restart can be made. Operation in the flux-vector controlled doubly-fed mode is as described above for FIG. 8.

FIG. 4 shows plots 90 and 92 of power, plot 96 of stator S1 frequency, and plot 98 of voltage—all versus speed, for typical dual 4-pole brushless doubly-fed motor 60 connected to 60 Hz AC power line 14, through AC switch 16. For constant torque applications, both stator windings are made identical, and the three-phase current regulator is rated at about 50% of the motor rating at maximum speed. As shown by FIGS. 4B and 4C, the S1 frequency of plot 96 and voltage of plot 98 are proportional to speed up to 900 RPM in singly-fed mode, under box 86. As shown by FIG. 4A, the three-phase current regulator power output of plot 92 is proportional to motor output power, reaching a maximum of 50% of rated motor power at 900 RPM and rated load, neglecting losses. At or near 900 RPM, control is switched to doubly-fed motor flux vector control, under box 88, for the speed range 900 to 1750 RPM. The AC line supplies power in plot 90 proportional to output torque to stator S2 at all speeds, once the AC switch is closed; neglecting losses this power ranges from zero at no load to 50% of the rated motor output power at rated torque. Again neglecting losses, the three-phase current regulator supplies power in plot 92 proportional to the product of torque and the difference between 900 RPM and the operating speed to stator S1 at speeds above 900 RPM. This power ranges from zero at 900 RPM, to almost 50% of motor rating at 1750 RPM and rated load.

Variable torque applications, typically fans and pumps, require a torque output approximately equal to the square of the speed. Then the rating of controller 158 can be reduced to about one-third of the rated output of motor 60 by winding stator S1 with twice the number of turns as on stator S2, giving it twice the voltage constant of S2. FIG. 5 shows a plot 102 of torque, a plot 104 of stator S1 frequency, and a plot 106 of voltage—all versus speed for typical dual 4-pole brushless doubly-fed motor 60 connected to a 60 Hz AC power system 14 through AC switch 16, for variable torque operation. The synchronous speed of this motor is 900 RPM, and it can be operated with a variable speed load from zero to 1350 RPM using three-phase current regulator 158 rated at one-third the rating of motor 60 at 1350 RPM. This motor is controlled with the dual-mode controller of FIG. 2B, using the control block diagrams of FIGS. 8, 9 and 13, as described for constant torque drives above. Motor 60 is operated in the region under box 86 with AC switch 16 open and shorting switch 62 closed, from zero to approximately 900 RPM. Control 120 operates the motor at full excitation using the control of FIG. 13, from zero to approximately 450 RPM, at which speed, the controller output voltage of plot 106 will be the maximum available as shown in FIG. 5C. Torque in this speed range can be up to nearly 100% of the rating in the doubly-fed connection without exceeding the motor or control capacity, as shown by FIG. 5A. From approximately 450 RPM to 900 RPM, the field is progressively weakened with increasing speed, using the automatically reduced excitation described for FIG. 13 above to maintain the voltage near maximum. Available torque at 100% S1 current is reduced inversely with speed to near 50% of rated at 900 RPM. At or near this speed, the control is switched to doubly-fed flux vector control, under box 88. In the doubly-fed range from 900 RPM to 1350 RPM, the torque of plot 102 at 100% S1 current is 100% of the rating.

Note that plot 104 in FIG. 5B of frequency versus speed curve is identical to that of plot 96 in FIG. 4B, within the available speed range, and that the plots of the torque and voltage versus speed characteristics are determined by the stator windings. Any combination of stator windings may be used to achieve a specific speed range to suit an application within the limits of constant HP operation at sub-synchronous speeds. It is apparent that the available constant HP output of the motor in the field weakening portion of the speed range is the HP capacity of the control, which cannot be exceeded without a higher rated control.

Description of Alternate Embodiments for Dual-Mode Control of Brushless Doubly-Fed Induction Motors One alternate to the preferred embodiment of the present invention for flux vector induction motor control below synchronous speed, employs the PWM inverter control of the singly-fed motor shown in FIG. 14, with shorting switch 62 closed and AC switch 16 open. This control is simpler than the preferred vector control, but does not normally provide as good dynamic response or current limiting.

Another alternate embodiment employs the position feedback method of the flux vector control shown in FIG. 9 to achieve flux vector controlled doubly-fed operation above synchronous speed. This embodiment provides improved dynamic response, but increases the complexity and cost of the system.

Description of Preferred Embodiment for Control of Brushless Doubly-Fed Induction Generators with Variable Speed Input Co-generation applications often require that a generator operate over a limited variable speed range and have the ability to supply power to an AC power line. The block diagram of FIG. 15 shows a preferred embodiment of a flux vector control 320 for controlling generator 70 in such a system. Flux vector control 320 is identical to flux vector motor control 200 of FIG. 8, except that motor 60 is replaced with generator 70. Operation of flux vector control 320 to control generator 70 is as described above for the embodiment of FIG. 8, except that both the active (in-phase with S2 voltage) component of generated current conveyed on input 194 and the reactive or exciting component (lags S2 voltage by 90 degrees) of S2 current conveyed on input 198 can be commanded as desired from any suitable reference source. For example, an active current reference 322 provides an active current command on input 194 to both reactive current reference 204 reference and coordinate transformer 160, while reactive current reference 204 also is controlled with the signal on input 198, as described previously for FIG. 8, producing an output signal that is input to the coordinate transformer on input 196.

In the preferred embodiment, operation of generator 70 is initiated as described in regard to FIG. 9, but modified by calculating the starting excitation frequency from the measured line frequency and the generator speed and setting this result as the synchronization frequency output of frequency and phase controller 226. Normal full machine excitation is applied by the output preset reactive current controller 234 on input 196. These commands cause coordinate transformer 160 to output a current vector command at the preset frequency and amplitude. The three-phase current regulator 158 converts this command into the commanded current vector in S1, causing a three-phase S2 voltage rotating in the same direction as and at a frequency and amplitude close to the AC line. Reactive current controller 234 and frequency and phase controller 226, which operate as proportional plus integral controllers, are then enabled, with initial output conditions equal to the preset values. These values will cause the closed voltage loop to drive the S2 output voltage to the AC line voltage, and the closed phase controller loop to drive the S2 output into frequency and phase synchronism with the AC power line, enabling AC switch 16 to be closed to initiate doubly-fed flux vector control. The block diagram of FIG. 9 is then switched to that of FIG. 15, with an initial condition wherein the reactive current reference 204 is set to the IDSlref value of input 196. This switching method insures that doubly-fed flux vector control is only initiated by closing AC switch 16 after the flux in the generator has been synchronized to oppose the voltage of AC power line 14. This approach avoids the occurrence of uncontrolled currents and insures minimal electrical and torque transients in the system. In any circumstance where currents exceed desired limits, the AC switch can be opened and a flying restart can be made. The generator can be controlled to maintain a 1.0 power factor at S2 or can supply leading current for power factor correction.

FIGS. 6A, 6B, and 6C respectively show plots 110, 112, and 114 of power, a plot 116 of stator S1 frequency, and a plot 118 of voltage—all versus speed, for typical dual 2-pole brushless doubly-fed generator 70 connected to a 60 Hz AC power line 14. Stator S1 is wound with 4 times the number of turns on S2, giving it 4 times as high a voltage constant and limiting the generating speed range to ±25 percent of the 1800 RPM synchronous speed. As shown by plot 110 in FIG. 6A, stator S2 connected to the AC power line 14 supplies 80% of the generated power provided to the AC line at maximum speed, and plot 112 shows that the control supplies 20% of the output power from S1. For the same torque load on the prime mover, plot 110 shows that S2 continues to supply 80% of the maximum speed power while plot 112 shows that the control power from S1 declines with decreasing speed to zero at 1800 RPM and becomes negative below 1800 RPM. With the same prime mover torque load at the minimum speed of 1350 RPM, the control supplies 20% of maximum speed power to S1. Stator S2 continues to supply 80% power to the AC line, resulting in a net generated power shown in plot 114 of 60% of that available at the maximum speed of 2250 RPM.

The required power rating of three-phase current regulator 158 is proportional to the maximum variation of rotor shaft speed from synchronous speed; a control with 25% of generator synchronous speed output rating is required for 25% speed variation from synchronous speed. A regenerative (bidirectional) three-phase current regulator capable of supplying power from S1 to the AC power line is required for operation above synchronous speed. A unidirectional current regulator is adequate for sub-synchronous generation.

Generator control will normally be coordinated with the prime mover. In the case of a wind turbine prime mover, the available torque is typically proportional to the square of speed. Generator torque may be commanded by the wind turbine controller to optimize performance of the generating system under the prevailing conditions. For diesel or natural gas engine prime movers, torque capacity is usually constant over the operating range. In this event, active current reference 194, which provides a control signal equivalent to a torque command, can be set to a fixed value corresponding to the desired engine torque, and the engine speed can be varied to control the amount of power supplied to the AC power line. Any method of setting the active or reactive current reference signal conveyed on input 194 may be used, so long as the commanded current does not exceed the capacity of the generator, the current regulator, or the current sensors.

Standalone generation applications where there is no AC power line available often have variable shaft speed inputs or widely varying load requirements. Typical variable shaft speed inputs include wind turbines and the main engines of ships. A diesel engine driven generator with variable electrical loads can be operated at low speeds when the load is light and at maximum speed only when the load is maximum, thus reducing the engine wear and fuel consumption. Control 120 of FIG. 16 provides constant frequency and voltage output power for variable speed standalone generation. Generator 70, current sensors 20a and 290b, and 152a and 152b, S1 current vector calculator 156, and coordinate transformer 160 are as described previously. AC switch 16 is connected between generator S2 output 34 and an AC load. The output of three-phase PWM inverter 240 is connected to stator S1 of generator 70, its AC power input is connected to stator S2 output 34a, 34b, and 34c of the generator, and its DC bus is connected to a DC bus starting power source 42 by leads 404a and 404b. This starting source furnishes power to operate the control until adequate power is supplied to three-phase PWM inverter 240 from the generator output. Inputs to an S2 voltage vector calculator and demodulator 374 are connected to outputs 162a and 162b of S2 current sensors 20a and 20b, and the three-phase output of S2, which is typically sensed by two step-down isolation transformers 130a and 130b via connections to voltage taps 18a, 18b, and 18c, as shown in FIG. 7. The S2 voltage vector calculator and demodulator computes the S2 voltage vector magnitude and angle and demodulates the S2 current relative to the S2 voltage to obtain the active component, $I_{QS2}$, corresponding to torque on the shaft of generator 70.

Output 202, $I_{QS2}$, is provided for connection to the prime mover speed control (not separately shown) for use in setting generator speed to maintain its speed and torque at desired levels. A/$V_{hd\,S2}$/output 212 is connected to an input of a comparator 380 and $\angle_{VS2}$ output 214 is connected to an input of a comparator 382. Comparator 380 subtracts voltage feedback 212 from a voltage reference output 378 supplied by a voltage reference 376, and a resulting error 400 is input to a voltage controller 398. The voltage controller is typically an integral control, which develops a percent modulation (% MOD) output 402 that is supplied to coordinate transformer 160 and which is limited by input 396 from a current limiter 394. The voltage loop gain is typically set in the range 10 to 100 per second, corresponding to a voltage loop bandwidth of about 1.5 to 15 Hz. Current limiter 394 is supplied with/$I_{S1}$/on conductor 372 from S1 current vector calculator 156, and limits the % MOD output 402 of voltage controller 398 when S1 current exceeds a preset value. This high gain limiting circuit will proportionally reduce maximum % MOD with increasing overcurrent down to zero at about 10% overcurrent. The current limiter may also incorporate a root mean square (r.m.s.) current limiting capability, which reduces the current limit with time to provide thermal protection of the generator and three-phase PWM inverter. Comparator 382 subtracts $\angle_{VS2}$ input 214 from a $\angle_{FR}$ input 386 provided by a frequency reference 384, and a resulting error 388 is integrated by an integrator 390 to obtain a $\angle_{S1V}$ output 392, which is input to coordinate transformer 160. The gain of integrator 390 is set to obtain a typical frequency loop gain of 10 to 100 per second, corresponding to a frequency control loop bandwidth of about 1.5 to 15 Hz. Coordinate transformer 160 operates as previously described, except with single input 402.

In operation, once the generator reaches its minimum operating speed, the control of FIG. 16 is used to raise the output voltage and frequency to the preset levels. The voltage controller input is initially very large and causes the voltage to rapidly rise to the preset voltage reference, where it is then regulated by the loop. The frequency control loop will synchronize the frequency of the generator output with the reference due to the action of the integrating loop. When the frequency and voltage of the generator output are within an acceptable tolerance of the reference values, AC switch 16 is closed to connect the generator to the load. Because S1 is fed with sinusoidal voltage from the inverter, the generator output voltage will be sinusoidal, while the currents in S1 and S2 can be non-sinusoidal, as demanded by the load. Increasing load will temporarily reduce the output voltage, causing a voltage error, which will increase the % MOD signal conveyed on input 402 to raise the output voltage of the generator. Any current beyond the current limit setting will cause the current limiter to reduce the maximum % MOD output of the voltage controller, thus reducing the voltage to reduce the current supplied to the load. The power capacity of this standalone generating system is as described above for the AC line-connected generator.

$I_{QS2}$ output 202 supplied to control the prime mover can be used to adjust the prime mover speed as a function of the standalone generator load. As an example, if 10% of rated capacity is reserved for short-term overloads on generator 70 with the characteristics shown in FIGS. 6A, 6B, and 6C, the prime mover would be run at a minimum speed of 1350 RPM until the load indicated by $I_{QS2}$ exceeded 50% of the generator rating. The speed of the prime mover (and of the generator) would then be increased proportionally with increasing load to 2250 RPM at 90% load.

Automatic switching between the co-generation and standalone generator operating modes can be accomplished as shown in the power circuit block diagram of FIG. 17. This arrangement combines the power circuit block diagrams of FIGS. 2A and 2C, with added switching to enable automatically changing between the two operating modes. This ability to change modes enables the generator to be used for co-generation when the AC power line is available and for standalone emergency power when the AC power line is lost. To operate in the co-generation mode, an AC line control power contactor 420 is closed, and after the generator is running at or above its minimum rated speed, synchronization is performed as previously described. A contactor 416 is then closed to supply power to the line.

To operate in the standalone mode, a DC bus starting power source initially supplies power to inverter 240 within control 120, and after the generator is running at or above its minimum rated speed, the generator output voltage and frequency are brought to desired operating levels, as described above. A contactor 422 is then closed to supply power from generator 70 to the control. Finally, a contactor 418 is closed to supply power to the load.

Description of Alternate Embodiment for Control of Brushless Doubly-Fed Induction Generators with Variable Speed Input A higher performance alternate embodiment, shown in FIG. 18, uses the shaft position sensor method in a flux vector control 430 for co-generation into an AC line as previously described for flux vector control 280 motor operation in FIG. 11. Flux vector control 430 of FIG. 18, which is used for controlling generation of electrical power into an AC power line, is identical to flux vector control 280 of FIG. 11, except that for use of flux vector control 430, generator 70 replaces motor 60. Both the active or real component of generated S2 current on input 194 and the reactive or exciting component of S2 current 196 can be commanded as desired from any suitable reference source. This method can provide better dynamic performance than that used in the other embodiments, but requires the addition of shaft position sensor 270. The method of the control in FIG. 18 is superior when rapid dynamic performance, such as rapidly varying high accelerations, are required. This same shaft position sensor method may also be applied to the standalone generator of FIG. 16 for generation into a load not connected to an AC power line.

Other Alternate Embodiments for Control of Brushless Doubly-Fed Induction Generators with Variable Speed Input Yet other alternatives that employ flux vector controls 260 and 300, which were described in regard to controlling a motor in FIGS. 10 and 12, may be applied to control generator 70, as well. Advantages and disadvantages of these flux vector controls are as previously discussed.

Although the present invention has been described in connection with the preferred form of practicing it and modifications thereto, those of ordinary skill in the art will understand that many other modifications can be made to the present invention within the scope of the claims that follow. Accordingly, it is not intended that the scope of the invention in any way be limited by the above description, but instead be determined entirely by reference to the claims that follow.

The invention in which an exclusive right is claimed is defined by the following:

1. A method of field oriented control for substantially independently controlling an excitation current and a torque producing current of a doubly-fed induction machine having a first polyphase stator winding and a second polyphase stator winding that are substantially electrically and magnetically independent, and a brushless induction rotor assembly that magnetically couples the first and the second polyphase stator windings in a reverse phase sequence, wherein a desired excitation current and a desired torque producing current in one polyphase stator winding are defined in stationary coordinates by a quadrature current command and an in-phase current command, respectively, the method comprising the steps of:
    (a) coupling the first polyphase stator winding to a polyphase electronic power converter having a power input connected to an alternating current (AC) line, and coupling the second polyphase stator winding to the AC line;
    (b) monitoring currents in at least two phases of the first polyphase stator winding and in at least one phase of the second polyphase stator winding;
    (c) monitoring a voltage of at least one phase of the AC line;
    (d) as a function of the currents that are monitored in step (b) and as a function of the voltage of the AC line monitored in step (c), calculating an angle of one of:
        (i) a voltage vector induced on the first polyphase stator winding by the AC line; and
        (ii) a flux vector in the first polyphase stator winding caused by the AC line, said flux vector lagging the voltage vector by 90 electrical degrees; and
    (e) coordinate transforming an in-phase command and a quadrature command, using the angle of step (d), to produce polyphase commands that are supplied to the polyphase electronic power converter, said polyphase commands causing the polyphase electronic power converter to maintain a torque producing component vector of the current in the first polyphase stator winding substantially proportional to the in-phase current command and substantially in one of a zero degree and a 180 degree relationship with the voltage vector of step (d), as required to produce a desired torque and to maintain an excitation component vector of current in the first polyphase stator winding substantially in quadrature with the voltage vector of step (d).

2. The method of claim 1, wherein the second polyphase stator winding is initially selectively not coupled to the AC line, further comprising the steps of:
    (a) synchronizing a voltage on the second polyphase stator winding with the voltage of the AC line; and then,
    (b) selectively coupling the second polyphase stator winding to the AC line.

3. The method of claim 1, wherein the polyphase electronic power converter is configured as a current regulator, current in the first polyphase stator winding is controlled, the quadrature current command is the quadrature command, the in-phase current command is the in-phase command, and the excitation component of the current in the first polyphase stator winding is substantially proportional to the quadrature current command.

4. The method of claim 1, wherein the polyphase electronic power converter is configured as an inverter, and current in the second polyphase stator winding is controlled, further comprising the steps of:
    (a) determining an in-phase current vector component and a quadrature current vector component, in stationary coordinates, for the second polyphase stator winding relative to the AC line;
    (b) as a function of a difference between the in-phase current command and the in-phase current vector component, determining the quadrature command for use in the coordinate transforming step;
    (c) as a function of a difference between the quadrature current command and the quadrature current vector component, determining the in-phase command for use in the coordinate transforming step; and
    (d) causing the excitation component of current in the first polyphase stator winding to be substantially inversely proportional to the quadrature current command.

5. The method of claim 1, wherein the polyphase electronic power converter is configured as an inverter, and currents in the first polyphase stator winding are controlled, further comprising the steps of:
    (a) determining an in-phase current vector component and a quadrature current vector component in stationary coordinates for the first polyphase stator by coordinate transforming the current in the first polyphase stator winding by the angle of the voltage vector induced on the first polyphase stator winding;

(b) as a function of a difference between the in-phase current command and the in-phase current vector component, determining the quadrature command for use in the coordinate transforming step of claim 1;

(c) as a function of a difference between the quadrature current command and the quadrature current vector component, determining the in-phase command for use in the step of coordinate transforming of claim 1; and (d) causing the excitation component of current in the first polyphase stator winding to be substantially proportional to the quadrature current command.

6. The method of claim 3, further comprising the steps of:

(a) determining an in-phase component of the current monitored in the second polyphase stator winding, relative to the AC line voltage; and (b) determining the in-phase current command as a function of a difference between a reference in-phase current command for the second polyphase stator winding and the in-phase component of the current monitored in the second polyphase stator winding.

7. The method of claim 3, further comprising the steps of:

(a) determining a quadrature component of the current monitored in the second polyphase stator winding, relative to the AC line voltage; and (b) determining the quadrature current command as a function of a difference between a reference quadrature current command for the second polyphase stator winding and the quadrature component of the current monitored in the second polyphase stator winding.

8. The method of claim 1, wherein the step of calculating the angle of the voltage vector comprises the steps of:

(a) determining an in-phase component for the current monitored in the second polyphase stator winding, which is in-phase relative to the AC line voltage;

(b) multiplying the in-phase component thus determined by a current transformation ratio between the second polyphase stator winding and the first polyphase stator winding, to determine a component of a current in the first polyphase stator winding that is in-phase relative to the voltage vector;

(c) determining a magnitude and an angle of a total current vector for the first polyphase stator winding;

(d) determining a difference angle between a vector for the current that is in-phase in the first polyphase stator winding and the total current vector for the first polyphase stator winding; and (e) adding the angle of the total current vector in the first polyphase stator winding to the difference angle, to determine the angle of the voltage vector induced on the first polyphase stator winding.

9. The method of claim 1, further comprising the steps of:

(a) sensing a rotational position of a shaft on which the brushless induction rotor assembly is mounted, producing a rotational position signal; and (b) determining a short term value for the angle of the voltage vector on the second polyphase stator winding as a function of the rotational position signal; and (c) correcting the short term value for the angle of the voltage vector with the angle of the voltage vector induced on the first polyphase stator winding by the AC line.

10. The method of claim 1, wherein the step of calculating the angle of the voltage vector comprises the steps of:

(a) determining a vector sum of a current vector angle for currents in the first polyphase stator winding and in the second polyphase stator winding;

(b) subtracting a vector angle for the voltage on the AC line from the vector sum to produce an uncorrected angle for the voltage vector induced on the first polyphase stator winding; and (c) correcting the uncorrected angle of the voltage vector as a function of current in the second polyphase stator winding and the polyphase current commands, producing the angle of the voltage vector induced on the first polyphase stator winding by the AC line.

11. The method of claim 1, further comprising the step of controlling the quadrature current command to achieve a desired power factor for the second polyphase stator winding.

12. The method of claim 1, wherein the doubly-fed induction machine is employed as a motor, further comprising the steps of:

(a) determining a rotational speed of the doubly-fed induction machine from the voltage and current that were monitored, producing a speed signal;

(b) determining a difference between the speed signal and a desired rotational speed of the doubly-fed induction machine to determine a speed error; and (c) producing the in-phase current command as a function of the speed error.

13. The method of claim 1, wherein the second polyphase stator winding is initially selectively not coupled to the AC line, further comprising the steps of:

(a) selectively shorting the second polyphase stator winding at rotational speeds of the doubly-fed induction machine less than a synchronous speed; and (b) selectively unshorting the second polyphase stator winding and selectively coupling the second polyphase stator winding to the AC line at rotational speeds of the doubly-fed induction machine that are above the synchronous speed, where the synchronous speed is a rotational speed of the doubly-fed induction machine at which a frequency of the first polyphase stator winding is equal to zero with the second polyphase stator winding selectively coupled to the AC line.

14. The method of claim 1, wherein the doubly-fed induction machine is employed as a generator, further comprising the steps of:

(a) determining a rotational speed of the generator from the voltage and current that were monitored, producing a speed signal; and (b) producing the in-phase current command as a function of the speed signal to achieve a desired torque required to drive the generator.

15. The method of claim 1, wherein the doubly-fed induction machine is employed as a generator, and the second polyphase stator winding is initially selectively not coupled to the AC line, further comprising the steps of:

(a) coupling the second polyphase stator winding to one side of a first open switch and to one side of a second open switch, another side of the first open switch being coupled to an alternating current (AC) line, and another side of the second open switch being coupled to an AC load;

(b) enabling selective operation of the generator in one of a co-generation mode and a standalone mode;

(c) when operation in the co-generation mode is selected:
  (i) monitoring one of:
    (1) voltages on each side of the first open switch, for at least one phase; and
    (2) a voltage across the first open switch, for at least one phase;

(ii) prior to closing the first open switch and in response to said one of the voltages monitored in step (c)(i), automatically regulating one of a polyphase voltage and a polyphase current applied to the first polyphase stator winding by the electronic power converter so as to cause the voltage across the first open switch to approach a substantially zero value;

(iii) automatically closing the first open switch when the voltage across the first open switch is substantially zero; and (iv) controlling a current supplied to the AC line by the machine, by controlling the polyphase current supplied to the first polyphase stator winding by the electronic power converter; and (d) when operation in the standalone mode is selected to energize the AC load:

(i) controlling an output of the second polyphase stator winding with the electronic power converter, to attain a desired output; and (ii) then closing the second open switch to supply power to the load from the doubly-fed induction generator.

16. A field oriented control for a doubly-fed induction machine having a first polyphase stator winding and a second polyphase stator winding that are substantially electrically and magnetically independent, and a brushless induction rotor assembly that magnetically couples the first polyphase stator winding to the second polyphase stator winding in reverse phase sequence, said second polyphase stator winding being coupled to an alternating current (AC) line, comprising:

(a) an electronic power converter adapted to couple to the first polyphase stator winding and to the AC line;

(b) current inputs adapted to couple to current transducers that monitor currents in at least two phases of the first polyphase stator winding and in at least one phase of the second polyphase stator winding;

(c) a voltage input adapted to couple to a voltage transducer that monitors a voltage of at least one phase of the AC line;

(d) memory in which a plurality of machine instructions are stored; and (e) a processor coupled to the memory, said processor executing the machine instructions to cause the processor to carry out a plurality of functions, including:

(i) calculating an angle of one of a voltage vector and a flux vector induced on the first polyphase stator winding by the AC line, as a function of the currents that are monitored by the current transducers and as a function of the voltage of the AC line monitored by the voltage transducer; and (ii) coordinate transforming an in-phase command and a quadrature command in stationary coordinates, using the angle of step (i), to produce polyphase commands that are supplied to the polyphase electronic power converter, said polyphase commands causing the polyphase electronic power converter to maintain a torque producing component vector of the current in the first polyphase stator winding substantially proportional to an in-phase current command and substantially in one of a zero degree and 180 degree relationship with the voltage vector of step (i), as required to produce a desired torque, and to maintain an excitation component vector of current in the first polyphase stator winding substantially in quadrature with the voltage vector of step (i).

17. The control of claim 16, further comprising an output that is adapted to operatively couple to a switch that is disposed between the second polyphase stator winding and the AC line and is initially open so that the second polyphase stator winding is initially not coupled to the AC line by the switch, the machine instructions further causing the processor to:

(a) synchronize a voltage on the second polyphase stator winding with the voltage of the AC line; and then, (b) selectively close the switch to couple the second polyphase stator winding to the AC line.

18. The control of claim 16, wherein the machine instructions further cause the processor to:

(a) configure the polyphase electronic power converter as a current regulator;

(b) control current in the first polyphase stator winding;

(c) employ the in-phase current command as the in-phase command and a quadrature current command as the quadrature command; and (d) maintain the excitation component of current in the first polyphase stator winding substantially proportional to the quadrature current command.

19. The control of claim 16, wherein the machine instructions further cause the processor to:

(a) configure the polyphase electronic power converter as an inverter;

(b) control current in the second polyphase stator winding;

(c) define a desired excitation current and a desired torque producing current in the second polyphase stator winding in stationary coordinates, by a quadrature current command and the in-phase current command, respectively;

(d) determine an in-phase current vector component and a quadrature current vector component, in stationary coordinates, for the second polyphase stator winding relative to the AC line;

(e) as a function of a difference between the in-phase current command and the in-phase current vector component, determine the quadrature command for use in coordinate transforming;

(f) as a function of a difference between the quadrature current command and the quadrature current vector component, determining the in-phase command for use in coordinate transforming; and (g) maintain the excitation component of current in the first polyphase stator winding substantially inversely proportional to the quadrature current command.

20. The control of claim 16, wherein the machine instructions further cause the processor to:

(a) configure the polyphase electronic power converter as an inverter;

(b) control currents in the first polyphase stator winding;

(c) define a desired excitation current and a desired torque producing current in the first polyphase stator winding by reference to a quadrature current command and the in-phase current command;

(d) determine in-phase and quadrature current vector components in the first polyphase stator winding in stationary coordinates by coordinate transforming the current monitored in the first polyphase stator winding by the angle of the voltage vector induced on the first polyphase stator winding;

(e) as a function of a difference between the in-phase current command and the in-phase current vector component, determine the quadrature command for use in coordinate transforming in claim 16(e)(ii);

(f) as a function of a difference between the quadrature current command and the quadrature current vector component, determine the in-phase command for use in coordinate transforming in claim 16(e)(ii); and (g) maintain the excitation component of current in the first polyphase stator winding substantially proportional to the quadrature current command.

21. The control of claim 16, wherein the machine instructions further cause the processor to calculate the angle of one the voltage vector and the flux vector induced on the first polyphase stator winding by:

(a) determining a magnitude of a vector for the current monitored in the second polyphase stator winding, which is in-phase relative to the AC line voltage;

(b) multiplying the magnitude of the vector thus determined by a current transformation ratio between the second polyphase stator winding and the first polyphase stator winding, to determine a magnitude of a current in the first polyphase stator winding that is in-phase relative to the voltage vector;

(c) determining a magnitude and an angle of a total current vector in the first polyphase stator winding;

(d) determining a difference angle between a vector for the current that is in-phase in the first polyphase stator winding and the total current vector in the first polyphase stator winding; and (e) adding the angle of the total current vector in the first polyphase stator winding to the difference angle, to determine said one of the angle of the voltage vector and the flux vector induced on the first polyphase stator winding.

22. The control of claim 16, further comprising an input adapted to couple to a shaft position sensor that produces a rotational position signal for a rotational position of a shaft on which the brushless induction rotor assembly is mounted, the machine instructions further causing the processor to:

(a) determine a short term value for the angle of one of the voltage vector and the flux vector as a function of the rotational position signal; and (b) correct the short term value for said angle with the angle that was calculated in claim 16(e)(i).

23. The control of claim 16, wherein the machine instructions cause the processor to calculate the angle of one of the voltage vector and the flux vector by:

(a) determining a vector sum of a current vector angle for currents in the first polyphase stator winding and in the second polyphase stator winding;

(b) subtracting a vector angle for the voltage on the AC line from the vector sum to produce an uncorrected angle for the voltage vector induced on the first polyphase stator winding; and (c) correcting the uncorrected angle of the voltage vector as a function of current in the second polyphase stator winding and the polyphase current commands, producing the angle of said one of the voltage vector and the flux vector induced on the first polyphase stator winding by the AC line.

24. The control of claim 16, wherein the machine instructions further cause the processor to control a quadrature current command that defines a desired excitation current to achieve a desired power factor for the second polyphase stator winding.

25. The control of claim 16, wherein the doubly-fed induction machine is employed as a speed controlled motor, and wherein the machine instructions further cause the processor to:

(a) determine a rotational speed of the speed controlled motor from the voltage and the current that were monitored, producing a speed signal;

(b) determine a difference between the speed signal and a desired rotational speed of the doubly-fed induction machine to determine a speed error; and (c) produce the in-phase current command as a function of the speed error.

26. The control of claim 16, further comprising an output that is adapted to operatively control a switch that is disposed between the second polyphase stator winding and the AC line, said switch being initially open so that the second polyphase stator winding is not coupled to the AC line by the switch; and, an output adapted to operatively control a shorting switch coupled to the second polyphase stator winding, the machine instructions further causing the processor to:

(a) while the switch is initially open, selectively close the shorting switch to short the second polyphase stator winding at rotational speeds of the doubly-fed induction machine that are less than a synchronous speed; and (b) selectively open the shorting switch and selectively close the switch to couple the second polyphase stator winding to the AC line at rotational speeds of the doubly-fed induction machine that are above the synchronous speed, where the synchronous speed is a rotational speed of the doubly-fed induction machine at which a frequency of the first polyphase stator winding is equal to zero with the second polyphase stator winding selectively coupled to the AC line.

27. The control of claim 16, wherein the doubly-fed induction machine is employed as a generator, and wherein the machine instructions cause the processor to:

(a) determine a rotational speed of the generator from the voltage and the current that were monitored, producing a speed signal; and (b) produce the in-phase current command as a function of the speed signal to achieve a desired torque required to drive the generator.

28. The control of claim 16, wherein the doubly-fed induction machine is employed as a generator, further comprising:

(a) a first output that is adapted to operatively couple to a first switch that is disposed between the second polyphase stator winding and the AC line and is initially open so that the second polyphase stator winding is initially not coupled to the AC line by the switch;

(b) a second output adapted to operatively control a second switch that is disposed between the second polyphase stator winding and a load and is initially open so that the second polyphase stator winding is initially not coupled to the load by the second switch; and (c) wherein the machine instructions further cause the processor to:

(i) enable selective operation of the generator in one of a co-generation mode and a standalone mode, with the first switch and the second switch open, so that when operation in the co-generation mode is selected, the control:

(1) prior to closing the first switch and in response to said one of the voltages that is being monitored, automatically regulates one of a polyphase voltage and a polyphase current applied to the first polyphase stator winding by the electronic power converter so as to cause the voltage across the first switch to approach a substantially zero value;

(2) automatically closes the first switch when the voltage across the first switch while open is substantially zero; and (3) controls a current supplied to the AC line by the machine, by controlling the polyphase current supplied to the first polyphase stator winding by the electronic power converter; and (ii) when operation in the standalone mode is selected to energize the AC load, the control:

(1) controls an output of the second polyphase stator winding with the electronic power converter, to attain a desired output; and (2) then closes the second switch to supply power to the load from the doubly-fed induction generator.

29. A method for generating variable speed constant frequency power with a doubly-fed induction generator that is driven by an engine, said generator having a polyphase first stator winding and a second stator winding that are substantially electrically and magnetically independent, and a brushless induction rotor assembly that magnetically couples the first and second stator windings in a reverse phase sequence, the method comprising the steps of:

(a) coupling the polyphase first stator winding to a first set of AC power connections of an electronic power converter configured to operate as a variable voltage, variable frequency inverter, and coupling the second stator winding to a second set of AC power connections of the electronic power converter, said second stator winding also being selectively coupled to the load;

(b) monitoring at least one phase of the second stator winding to produce signals indicative of one of:

(i) a voltage and a frequency of said at least one phase; and (ii) a voltage and an electrical position of said at least one phase;

(c) regulating a frequency of a voltage applied by the electronic power converter to the first stator winding so that the frequency of said at least one phase on the second stator winding is substantially constant;

(d) regulating a voltage applied to the first stator winding by the electronic power converter so that the voltage on the second stator winding is substantially constant;

(e) monitoring a current in at least one phase of one of the first stator winding and the second stator winding of said generator; and (f) controlling a speed of the engine in response to the current that is monitored, the engine thereby driving said generator at a speed sufficient to meet the load coupled to the second stator winding of said generator.

30. The method of claim 29, wherein the second set of AC power connections of the electronic power converter is connected to a rectifier bridge, and wherein a maximum speed of the engine is limited to that at which the frequency on the first stator winding is substantially equal to zero.

31. The method of claim 29, wherein the second set of AC power connections of the electronic power converter is connected to an inverter bridge that is synchronized with the frequency of the second stator winding and a current provided by the second set of The apparatus of claim power connections is regulated to maintain a DC bus voltage of the inverter bridge at a preset voltage above a peak second stator winding voltage, thereby enabling power to flow bidirectionally to and from the second stator winding.

32. The method of claim 29, further comprising the step of supplying electrical power from a secondary power source to energize the electronic power converter, until the second stator winding can supply the electrical power required to energize the electronic power converter.

* * * * *